(12) United States Patent
Lin et al.

(10) Patent No.: US 8,545,062 B2
(45) Date of Patent: Oct. 1, 2013

(54) LIGHT UNIFORMIZATION STRUCTURE AND LIGHT EMITTING MODULE

(75) Inventors: Hui Hsiung Lin, Miaoli County (TW); Chi Hung Liao, Tainan (TW); Wen Hsun Yang, Taipei (TW); Han-Tsung Hsueh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 103 days.

(21) Appl. No.: 12/962,054

(22) Filed: Dec. 7, 2010

(65) Prior Publication Data

US 2011/0134648 A1    Jun. 9, 2011

Related U.S. Application Data

(63) Continuation-in-part of application No. 12/708,147, filed on Feb. 18, 2010.

(30) Foreign Application Priority Data

Dec. 8, 2009   (TW) ............................... 98141820 A
Nov. 10, 2010  (TW) ............................... 99138708 A

(51) Int. Cl.
   *F21V 5/02*    (2006.01)
(52) U.S. Cl.
   USPC ...... 362/339; 362/330; 362/223; 362/311.01; 362/607
(58) Field of Classification Search
   USPC ................ 362/97.2, 97.4, 222, 223, 217.02, 362/235, 244, 245, 311.01, 330, 339, 606, 362/607, 97.1, 217.03, 290, 337
   See application file for complete search history.

(56) References Cited

U.S. PATENT DOCUMENTS

| | | | | |
|---|---|---|---|---|
| 2,180,114 A | * | 11/1939 | Land | 362/19 |
| 3,234,376 A | * | 2/1966 | Ceglia | 362/330 |
| 3,522,985 A | * | 8/1970 | Rogers | 359/485.03 |
| 5,587,816 A | * | 12/1996 | Gunjima et al. | 349/62 |
| 6,417,831 B2 | | 7/2002 | Kashima | |
| 6,870,674 B2 | * | 3/2005 | Ookawa et al. | 359/455 |
| 7,074,463 B2 | | 7/2006 | Jones et al. | |

(Continued)

FOREIGN PATENT DOCUMENTS

CN   101055324 A   10/2007
CN   101118293 A   2/2008

(Continued)

OTHER PUBLICATIONS

State Intellectual Property Office of the People's Republic of China, "Office Action", May 28, 2012, China.

(Continued)

*Primary Examiner* — Ismael Negron
(74) *Attorney, Agent, or Firm* — Morris Manning & Martin LLP; Tim Tingkang Xia, Esq.

(57) ABSTRACT

A light uniformization structure including a first material layer having a plurality of microstructures in a surface thereof, a second material layer having a plurality of microstructures in a surface thereof, and a spacer layer located between the first material layer and the second material layer. The refractive index of the spacer layer is smaller than a refractive index of the first material layer and a refractive index of the second material layer. A light emitting module including the light uniformization structure is also disclosed.

25 Claims, 24 Drawing Sheets

(56) References Cited

U.S. PATENT DOCUMENTS

| | | | |
|---|---|---|---|
| 7,503,674 B2 | 3/2009 | Chang et al. | |
| 7,665,876 B2 * | 2/2010 | Taya et al. | 362/607 |
| 7,784,954 B1 * | 8/2010 | Coleman | 362/19 |
| 2007/0064294 A1 | 3/2007 | Hoshino et al. | |
| 2008/0030649 A1 | 2/2008 | Choi et al. | |
| 2008/0130117 A1 * | 6/2008 | Hsu et al. | 359/599 |
| 2009/0027885 A1 * | 1/2009 | Hoshi | 362/244 |
| 2009/0129059 A1 * | 5/2009 | Kumasawa et al. | 362/97.2 |
| 2009/0154157 A1 * | 6/2009 | Sah | 362/235 |
| 2009/0201665 A1 | 8/2009 | Goto | |
| 2009/0256993 A1 | 10/2009 | Oku | |
| 2009/0279302 A1 * | 11/2009 | Lee | 362/257 |

FOREIGN PATENT DOCUMENTS

| | | |
|---|---|---|
| CN | 101221265 A | 7/2008 |
| CN | 201141550 Y | 10/2008 |
| CN | 101545996 A | 9/2009 |
| TW | 200708845 | 3/2007 |
| WO | 2008093819 A1 | 8/2008 |

OTHER PUBLICATIONS

Japan Patent Office, "Office Action", Nov. 13, 2012, Japan.
Intellectual Property Office, Ministry of Economic Affairs, R.O.C., "Office Action", Mar. 29, 2013, Taiwan.
State Intellectual Property Office of the People's Republic of China, "Office Action", China, Jun. 4, 2013.

* cited by examiner

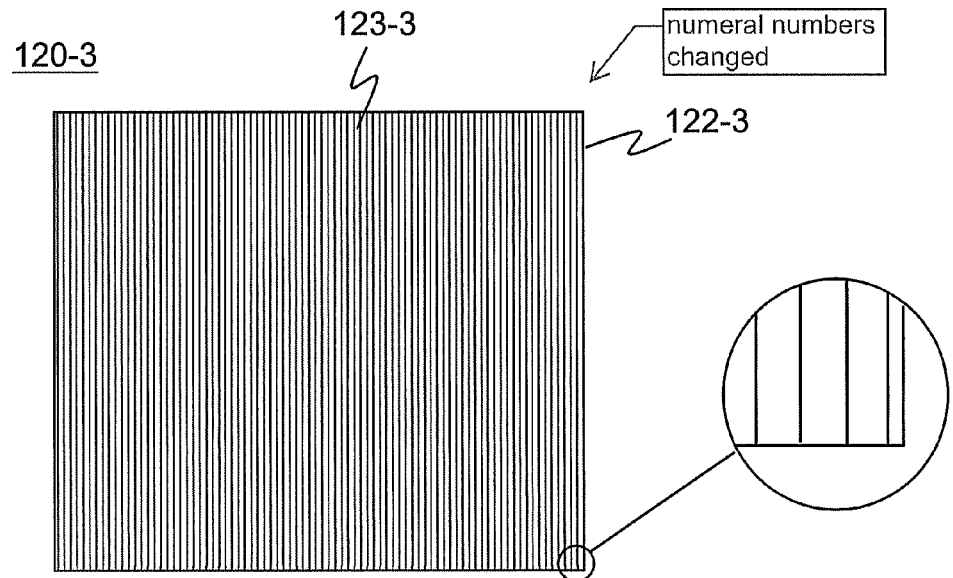
FIG. 4A
FIG. 4A-1
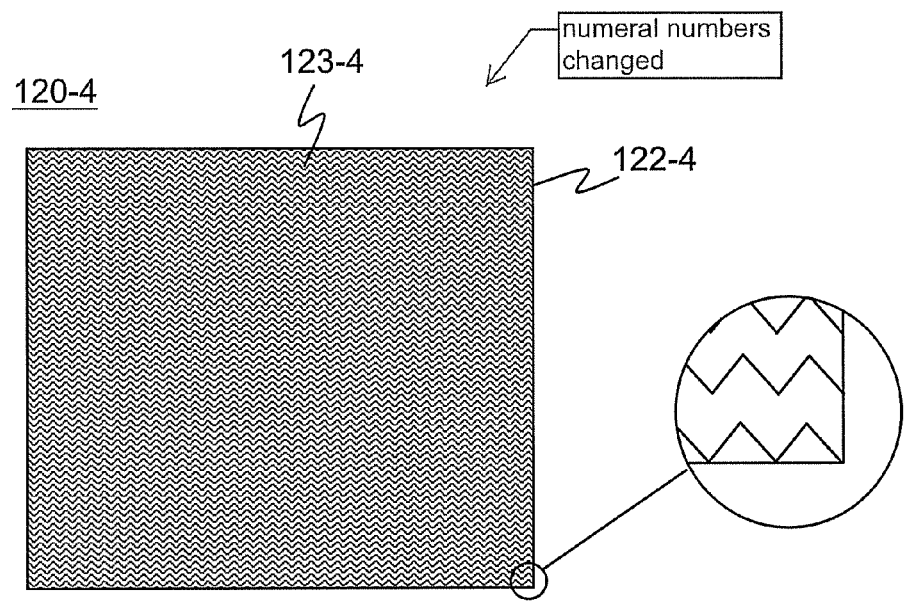
FIG. 4B
FIG. 4B-1

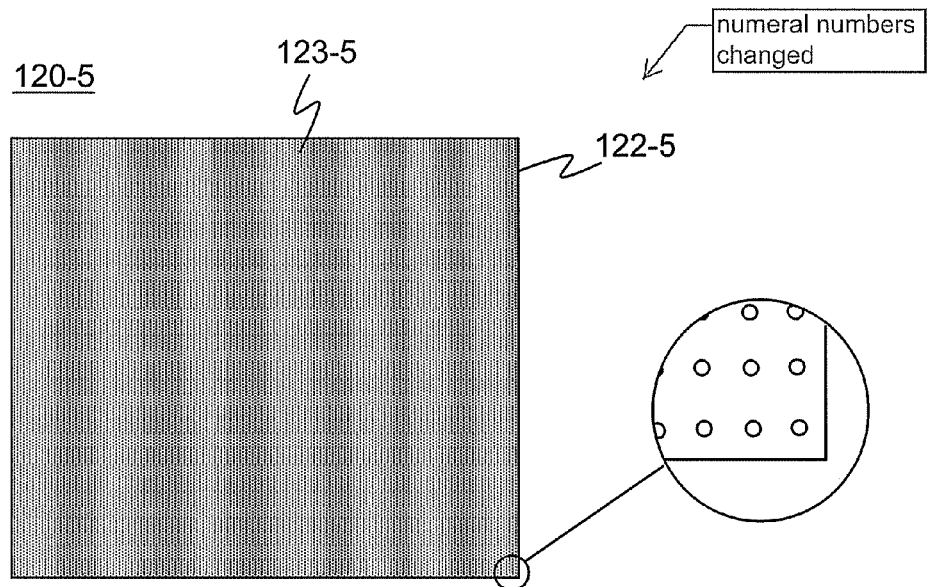
FIG. 5
FIG. 5-1
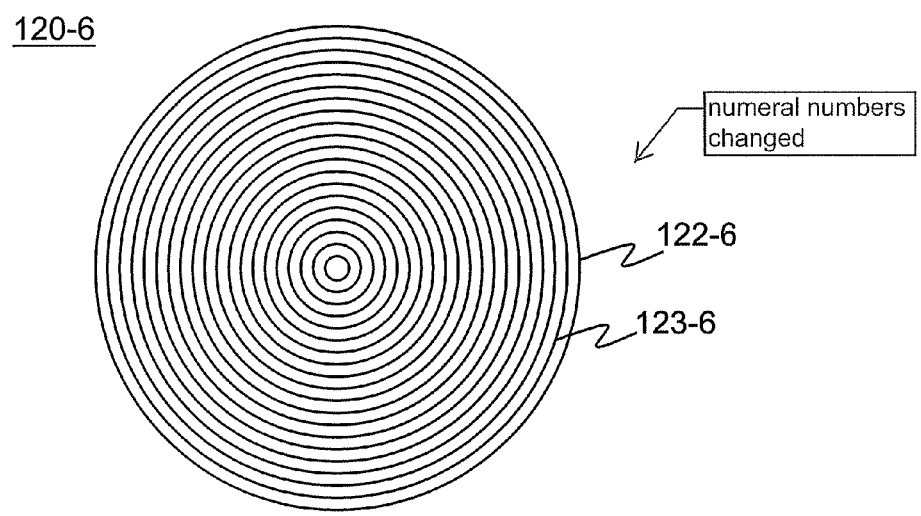
FIG. 6

US 8,545,062 B2

LIGHT UNIFORMIZATION STRUCTURE AND LIGHT EMITTING MODULE

CROSS-REFERENCE TO RELATED APPLICATIONS

This non-provisional application claims priority under 35 U.S.C. §119(a) on Patent Application No(s). 098141820 filed in Taiwan, R.O.C. on Dec. 8, 2009, and Patent Application No. 099138708 filed in Taiwan, R.O.C. on Nov. 10, 2010, as well as is a Continuation-in-part application of U.S. application Ser. No. 12/708,147, filed on Feb. 18, 2010, the entire contents of which are hereby incorporated by reference.

BACKGROUND

1. Field of the Disclosure

The disclosure relates to a light source module, and more particularly to a light uniformization structure and a light emitting module.

2. Related Art

With the advantages of small volume, low power consumption, and long service life, the light emitting diode (LED) is the most effective among all other novel light emitting elements in terms of energy saving and carbon reduction. In recent years, the LED has been widely applied to illumination devices. Moreover, with increasing awareness in green power, it is expected that LED illumination devices will gradually replace the conventional illumination devices. However, the light emitting principle and light emitting mode of the LED are quite different from the conventional light sources such as bulbs and tubes. Therefore, when the LED is applied to illumination devices, problems of non-uniform light source or poor luminous efficiency can occur.

SUMMARY

Accordingly, the disclosure is a light uniformization structure and a light emitting module, so as to solve the problems in the prior art.

The light uniformization structure of the disclosure comprises a first material layer, a second material layer, and a spacer layer.

The spacer layer is located between the first material layer and the second material layer, and a refractive index of the spacer layer is smaller than a refractive index of the first material layer and a refractive index of the second material layer.

The first material layer is light transmissive, and a plurality of microstructures is formed in a first surface of the first material layer. The second material layer is light transmissive, and a plurality of microstructures is formed in a first surface of the second material layer.

The spacer layer can be an air layer or a light-transmissive spacer material layer.

A second surface of the first material layer opposite to the first surface thereof faces the first surface of the second material layer. Moreover, the second surface of the first material layer can touch apexes of the microstructures in the first surface of the second material layer.

In addition, a base material can be disposed on and touch the second surface of the first material layer, and/or a base material can be disposed on and touch a second surface of the second material layer opposite to the first surface thereof.

Moreover, the light uniformization structure of the disclosure can be applied in a light emitting module, so as to receive light emitted by a light source module, uniformize the received light, and transmit the uniformized light.

Here, at least one light source module is located between the light uniformization structure and a base plate. A surface of the light uniformization structure faces a light emitting surface of the light source module, so as to receive light generated by the light source module.

The light uniformization structure and the light emitting module of the disclosure use a low refractive index layer and surface structures in combination to achieve a uniform light field and high transmittance. Moreover, the total reflection inside the light uniformization structure is reduced by using a geometrical-optics refraction mechanism (high refractive index layers clamping low refractive index layer), thereby improving the luminous efficiency of the light uniformization structure and the light emitting module.

BRIEF DESCRIPTION OF THE DRAWINGS

The disclosure will become more fully understood from the detailed description given herein below for illustration only, and thus are not limitative of the disclosure, and wherein:

FIGS. 4A and 4A-1 are schematic structural views of a third embodiment of a microstructure film;

FIGS. 4B and 4B-1 are schematic structural views of a fourth embodiment of a microstructure film;

FIGS. 5 and 5-1 are schematic structural views of a fifth embodiment of a microstructure film;

FIG. 6 is a schematic structural view of a sixth embodiment of a microstructure film;

DETAILED DESCRIPTION

The disclosure provides a light uniformization structure and a light emitting module that use a low refractive index layer and surface structures in combination to achieve a uniform light field and high transmittance. Moreover, the total reflection inside the light uniformization structure is reduced by using a geometrical-optics refraction mechanism (high refractive index layers clamping low refractive index layer), thereby improving the luminous efficiency of the light uniformization structure and the light emitting module.

In the following descriptions, "first" and "second" are merely used for denoting two elements (two surfaces, two material layers, or two basic materials), instead of specifying particular elements or sequences.

Figure 1:
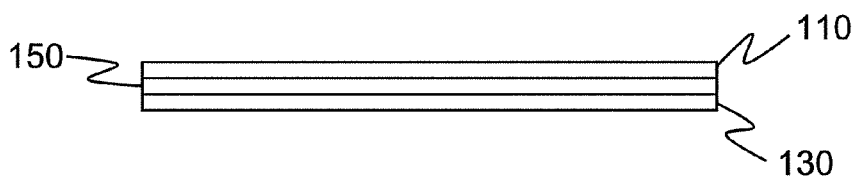
FIG. 1 is a schematic structural view of a light uniformization structure according to a first embodiment of the disclosure.

FIG. 1 shows a light uniformization structure according to an embodiment of the disclosure.

Referring to FIG. 1, a light uniformization structure 100 comprises two microstructure films 110, 130 and a spacer layer 150. The microstructure films 110, 130 and the spacer layer 150 are light transmissive. The light transmissive property is not limited to allowing the visible light to pass through but also allows the invisible light to pass through, and the light transmissive proportion is not limited herein.

The microstructure film 110, the spacer layer 150, and the microstructure film 130 are laminated in sequence.

Each of the microstructure films 110, 130 has a plurality of microstructures (which is not shown, and will be described hereinafter), and a refractive index of a material forming the microstructures is greater than a refractive index of the spacer layer 150.

Here, the spacer layer 150 can be air (or referred to as an air layer), that is, the microstructure films 110, 130 are spaced from each other by a particular distance, such that air is present between the microstructure films 110, 130.

Moreover, the spacer layer 150 can be a material layer having a refractive index of 1 to 1.5, referred to spacer material layer for clear description. Moreover, the refractive index of the material to be formed into the microstructures can be greater than 1.5. A difference between the refractive index of the spacer layer 150 and the refractive index of the material forming the microstructures can be equal to or greater than 0.08.

The spacer material layer can be made of an ultraviolet (UV) glue or polymethylmethacrylate (PMMA) having a refractive index smaller than 1.5. Furthermore, in manufacturing, the microstructure film 110, the spacer material layer 150 and the microstructure film 130 can be adhered to each other in order.

Here, the spacer layer 150 having a low refractive index and the microstructures can be used to refract light, so as to achieve a uniform light field and high transmittance.

Figure 2:
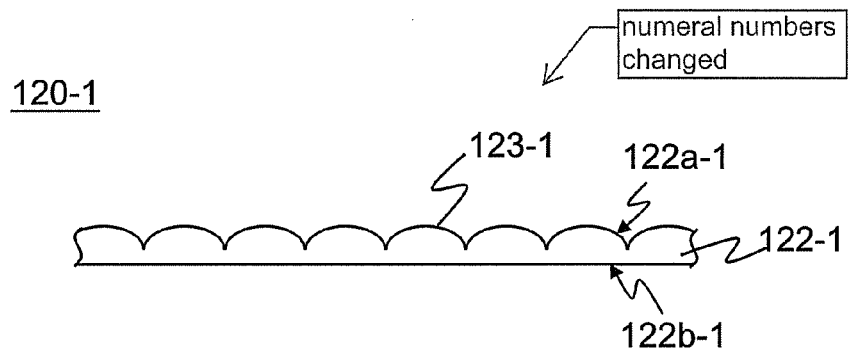
FIG. 2 is a schematic structural view of a first embodiment of a microstructure film.

Referring to FIG. 2, each microstructure film 120-1 (that is, the microstructure film 110/130 in FIG. 1) can be a material layer 122-1 having a refractive index greater than the spacer layer 150. The material layer 122-1 can be made of a UV glue, polycarbonate (PC), or poly ethylene terephthalate (PET) having a refractive index greater than 1.5.

The material layer 122-1 has two opposite surfaces, which are respectively referred to as a first surface 122a-1 and a second surface 122b-1 below for ease of illustration.

A plurality of microstructures 123-1 is provided in the first surface 122a-1 of the material layer 122-1. Here, the microstructures 123-1 can be distributed in the first surface 122a-1 of the material layer 122-1, or the microstructures 123-1 are connected to each other to form the first surface 122a-1 of the material layer 122-1. In other words, a portion of the first surface 122a-1 of the material layer 122-1 is formed into the microstructures 123-1, or whole first surface 122a-1 of the material layer 122-1 is formed into the microstructures 123-1.

Figure 3:
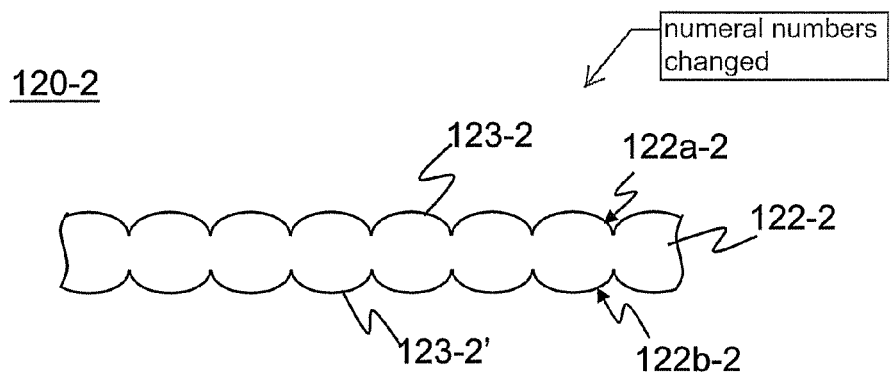
FIG. 3 is a schematic structural view of a second embodiment of a microstructure film.

In the microstructure film 120-2, as shown in FIG. 3, a plurality of microstructures 123-2 is provided in the first surface 122a-2 of the material layer 122-2.

In addition, a plurality of microstructures 123-2' may also be formed in the second surface 122b-2 of the material layer 122-2 (as shown in FIG. 3).

In other words, each microstructure film (that is, the microstructure film 110/130 in FIG. 1) may have microstructures in only one surface (which is not limited to the first surface 122a-1/122a-2, and may also be second surface 122b-1/122b-2), or have microstructures in both surfaces.

Here, when the surfaces of the microstructure film are viewed from the top, the microstructures in the surfaces of the material layer (the first surface and/or the second surface) form a stripe pattern (as shown in FIGS. 4A, 4A-1, 4B, and 4B-1), a mesh pattern (as shown in FIGS. 5 and 5-1), or a concentric-circle pattern (as shown in FIG. 6).

In the microstructure film 120-3, as shown in FIGS. 4A and 4A-1, the microstructures 123-3 in the surfaces of the material layer 122-3 form a stripe pattern, and the stripe pattern can be straight stripes.

In the microstructure film 120-4, as shown in FIGS. 4B and 4B-1, the microstructures 123-4 in the surfaces of the material layer 122-4 form a stripe pattern, and the stripe pattern can be curved stripes.

Or, the stripe pattern can be a mixture of straight stripes and curved stripes (not shown).

In the microstructure film 120-5, as shown in FIGS. 5 and 5-1, the microstructures 123-5 in the surfaces of the material layer 122-5 form a mesh pattern, and the mesh pattern can be a circular shape.

Microscopically, in the mesh pattern, each point may also have a rectangular, or other geometrical shapes.

In the microstructure film 120-6, as shown in FIG. 6, the microstructures 123-6 in the surfaces of the material layer 122-6 form a concentric-circle pattern.

Figure 7:
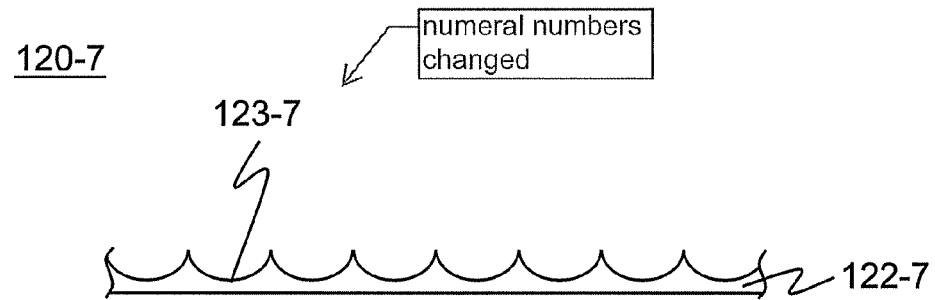
FIG. 7 is a schematic structural view of a seventh embodiment of a microstructure film.

In addition, when the microstructure film is viewed from the top, each microstructure can be a raised structure (e.g., the microstructure 123-1 as shown in FIG. 2) or a recessed structure (e.g., the microstructure 123-7 of the microstructure film 120-7 as shown in FIG. 7).

The raised structure may have a shape of a columnar structure, a V-shaped structure, a spherical structure, or an aspherical structure. The recessed structure may have a shape of a columnar structure, a V-shaped structure, a spherical structure, or an aspherical structure.

Figure 8:
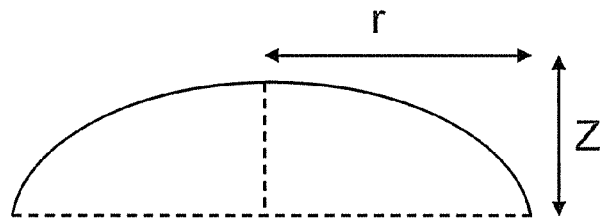
FIG. 8 is a schematic structural view of an embodiment of an aspherical microstructure.

Here, referring to FIG. 8, the aspherical structure is a curved surface that satisfies the following Equation 1.

$$Z = \frac{cr^2}{\left(1 + (1-(1+k)c^2r^2)^{\frac{1}{2}}\right)} \quad \text{Equation 1}$$

In the equation, Z represents a longitudinal radius, that is, a perpendicular distance between a tangent of an apex of the curved surface and a line passing through a lowest point of the curved surface and parallel to the tangent of the apex; c is a curvature of the central apex of the aspherical structure (that is, the curved surface); k is a conic constant; and r is a radial radius, that is, radius of curvature.

Figure 9:
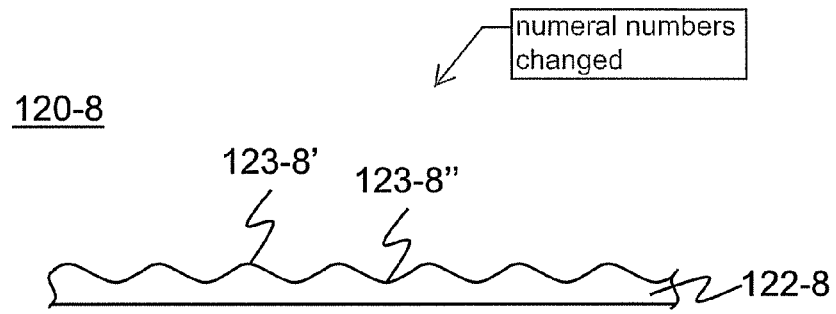
FIG. 9 is a schematic structural view of an eighth embodiment of a microstructure film.

Moreover, the microstructures in the same surface (the first surface or the second surface) can be structures of the same shape (as the microstructures 123-1 and 123-7 shown respectively in FIGS. 2 and 7) or structures of different shapes (as the microstructures 123-8' and 123-8" of the microstructure film 120-8 shown in FIG. 9).

For ease of description, the material layers serving as the microstructure films 110, 130 are respectively referred to a first material layer and a second material layer.

The first material layer may have microstructures in only one surface, or have microstructures in both surfaces. The second material layer may have microstructures in only one surface, or have microstructures in both surfaces.

Figure 10:
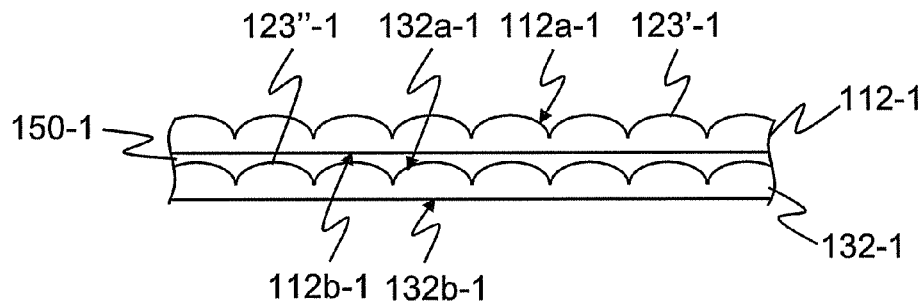
FIG. 10 is a schematic structural view of a light uniformization structure according to a second embodiment of the disclosure.
Figure 11:
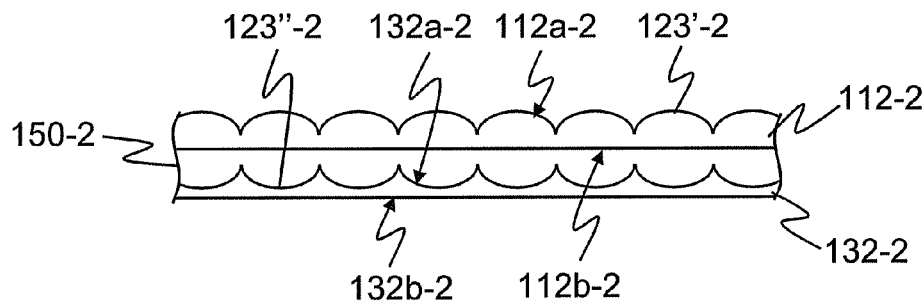
FIG. 11 is a schematic structural view of a light uniformization structure according to a third embodiment of the disclosure.

Referring to FIGS. 10 and 11, for ease of description, a case where the first surface of the first material layer has the microstructures and the first surface of the second material layer has the microstructures is taken as an example.

In the light uniformization structure 100-1, as shown in FIG. 10, the first surface 112a-1 of the first material layer 112-1 has the microstructures 123'-1 and the first surface 132a-1 of the second material layer 132-1 has the microstructures 123"-1. The microstructures 123'-1 in the first material layer 112-1 and the microstructures 123"-1 in the second material layer 132-1 may have the same design.

In the light uniformization structure 100-2, as shown in FIG. 11, the first surface 112a-2 of the first material layer 112-2 has the microstructures 123'-2 and the first surface 132a-2 of the second material layer 132-2 has the microstructures 123"-2. The microstructures 123'-2 in the first material layer 112-2 and the microstructures 123"-2 in the second material layer 132-2 may have different designs. The design of the first material layer 112-2 and the second material layer 132-2 having different microstructures and the effect thereof will be illustrated hereinafter.

As shown in FIG. 10, the second surface 112b-1 of the first material layer 112-1 faces the first surface 132a-1 of the second material layer 132-1.

The second surface 112b-1 of the first material layer 112-1 and the first surface 132a-1 of the second material layer 132-1 respectively touch two opposite surfaces of the spacer layer 150-1.

As shown in FIG. 11, the second surface 112b-2 of the first material layer 112-2 faces the first surface 132a-2 of the second material layer 132-2. The second surface 112b-2 of the first material layer 112-2 and the first surface 132a-2 of the second material layer 132-2 respectively touch two opposite surfaces of the spacer layer 150-2.

Figure 12:
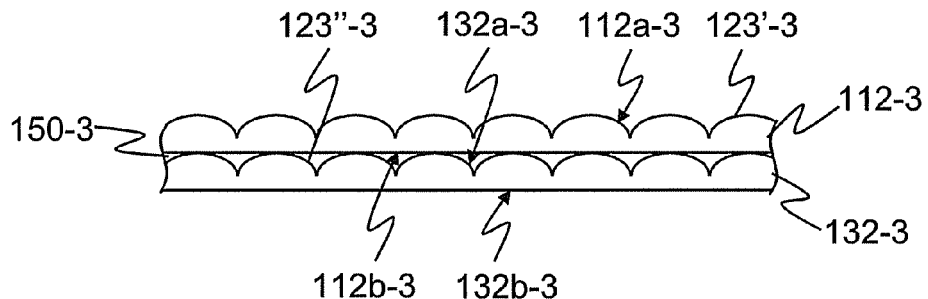
FIG. 12 is a schematic structural view of a light uniformization structure according to a fourth embodiment of the disclosure.

In the light uniformization structure 100-3, as shown in FIG. 12, the second surface 112b-3 of the first material layer 112-3 faces the first surface 132a-3 of the second material layer 132-3. The second surface 112b-3 of the first material layer 112-3 and the first surface 132a-3 of the second material layer 132-3 respectively touch two opposite surfaces of the spacer layer 150-3.

Figure 13:
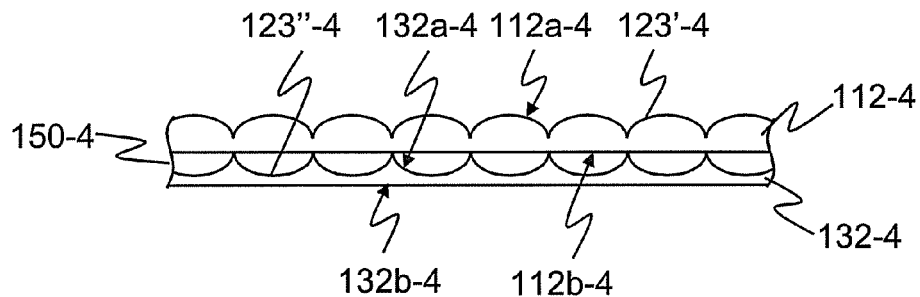
FIG. 13 is a schematic structural view of a light uniformization structure according to a fifth embodiment of the disclosure.

In the light uniformization structure 100-4, as shown in FIG. 13, the second surface 112b-4 of the first material layer 112-4 faces the first surface 132a-4 of the second material layer 132-4. The second surface 112b-4 of the first material layer 112-4 and the first surface 132a-4 of the second material layer 132-4 respectively touch two opposite surfaces of the spacer layer 150-4.

Here, as shown in FIGS. 10 and 11, the second surface 112b-1/112b-2 of the first material layer 112-1/112-2 can be spaced from apexes of the microstructures 123"-1/123"-2 in the first surface 132a-1/132a-2 of the second material layer 132-1/132-2, such that a medium (air or a particular material) serving as the spacer layer 150-1/150-2 is filled between the first material layer 112-1/112-2 and the second material layer 132-1/132-2, that is, the spacer layer 150-1/132-2 completely isolates the first material layer 112-1/112-2 from the second material layer 132-1/132-2.

Moreover, the second surface 112b-3/112b-4 of the first material layer 112-3/112-4 can touch the apexes of the microstructures 123"-3/132"-4 in the first surface 132a-3/132a-4 of the second material layer 132-3/132-4, such that the medium (air or a particular material) serving as the spacer layer 150-3/150-4 is filled in a space formed between two neighboring microstructures in the second surface 112b-3/112b-4 of the first material layer 112-3/112-4 and the first surface 132a-3/132a-4 of the second material layer 132-3/132-4, as shown in FIGS. 12 and 13.

Figure 14:
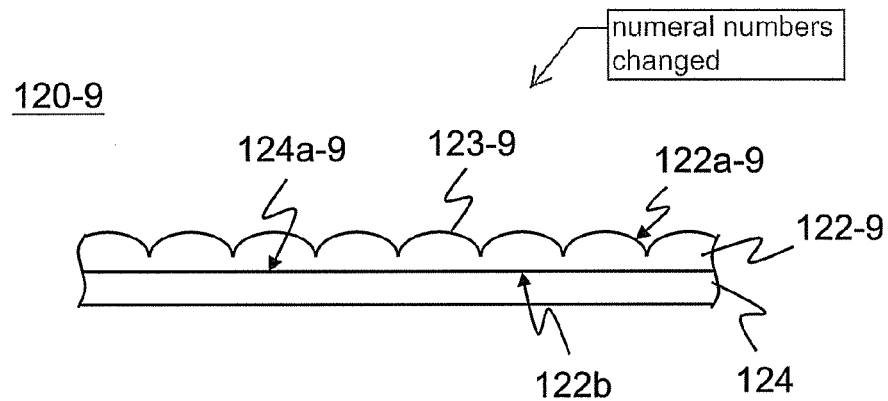
FIG. 14 is a schematic structural view of a ninth embodiment of a microstructure film.
Figure 15:
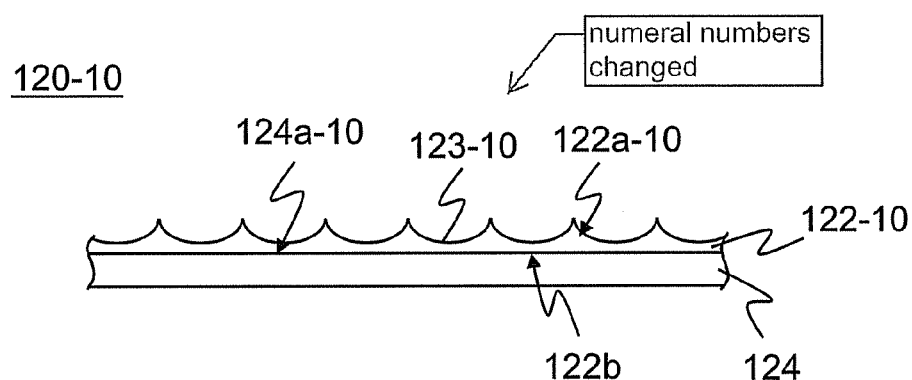
FIG. 15 is a schematic structural view of a tenth embodiment of a microstructure film.

Moreover, referring to FIGS. 14 and 15, each microstructure film 120-9/120-10 (that is, the microstructure film 110/130 in FIG. 1) may also be formed by a material layer 122-9/122-10 (that is, the first material layer or the second material layer) and a base material 124.

The material layer 122-9/122-10 is formed on one surface 124a-9/124a-10 of the base material 124.

The microstructures 123 are formed on the first surface 122a-9/122a-10 of the material layer 122-9/122-10, and the second surface 122b of the material layer 122-9/122-10 touches the base material 124.

The base material 124 can be a material having a refractive index close to the refractive index of the material layer 122-9/122-10. Here, the base material 124 can be a material having a refractive index equal to or greater than 1.49. Moreover, the base material 124 can be such a material that a difference between a refractive index of the material and the refractive index of the material layer 122-9/122-10 is smaller than or equal to 0.075. That is to say, a difference between the refractive index of the base material 124 and the refractive index of the material layer 122-9/122-10 is smaller than or equal to 0.075. For example, the base material 124 can be PMMA, PC, PET, or the like.

Figure 16:
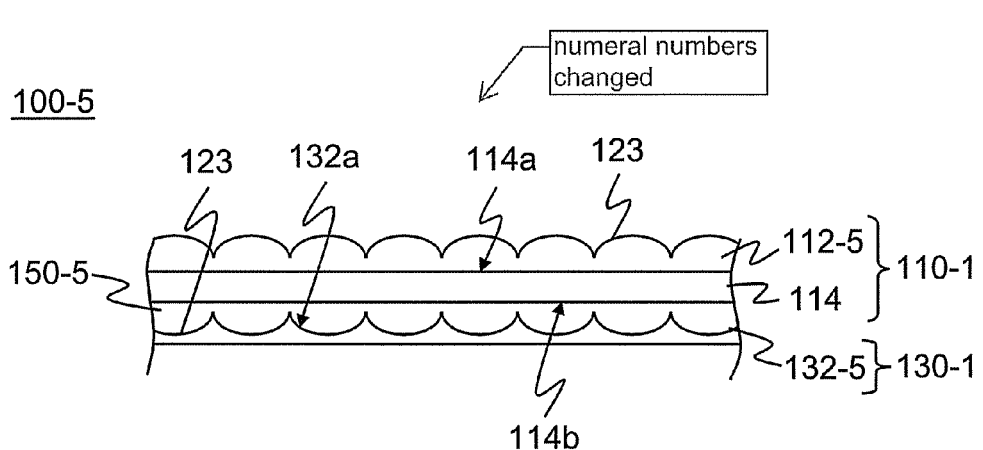
FIG. 16 is a schematic structural view of a light uniformization structure according to a sixth embodiment of the disclosure.
Figure 17:
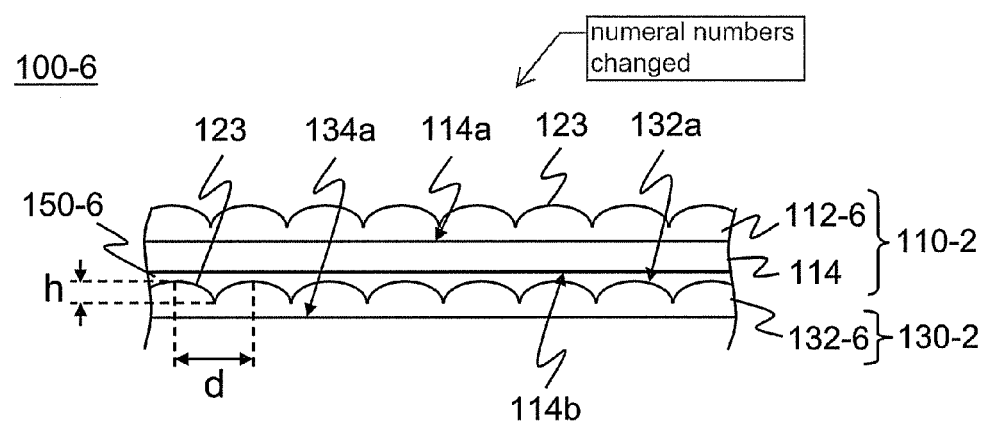
FIG. 17 is a schematic structural view of a light uniformization structure according to a seventh embodiment of the disclosure.

In the light uniformization structure, as shown in FIGS. 11 to 13, both of the two microstructure films (that is, the microstructure films 110, 130) can adopt a structure formed by a single material layer (that is, the first and the second material layers 112, 132). Alternatively, as shown in FIGS. 16 and 17, one microstructure film (that is, the microstructure film 130) adopts a structure formed by a single material layer (that is, the second material layer), the other microstructure film 120 (that is, the microstructure film) adopts a structure formed by the material layer (that is, the first material layer) and the base material 124 (that is, a base material 114). Alternatively, as shown in FIGS. 18 and 19, both of the two microstructure films (that is, the microstructure films 110, 130) adopt the structure formed by the material layer (that is, the first and the second material layers, 132) and the base material 124 (that is, base materials 114, 134).

In the light uniformization structure 100-5, as shown in FIG. 16, one microstructure film 130-1 adopts a structure formed by a single material layer (that is, the second material layer 132-5), the other microstructure film 110-1 adopts a structure formed by the first material layer 112-5 and a base material 114.

In the light uniformization structure 100-6, as shown in FIG. 17, one microstructure film 130-2 adopts a structure formed by a single material layer (that is, the second material layer 132-6), the other microstructure film 110-2 adopts a structure formed by the first material layer 112-6 and a base material 114.

Figure 18:
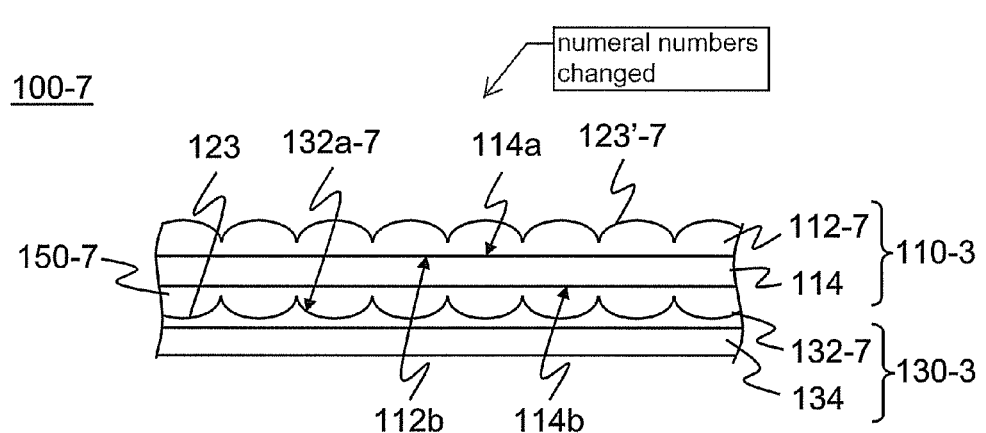
FIG. 18 is a schematic structural view of a light uniformization structure according to an eighth embodiment of the disclosure.
Figure 19:
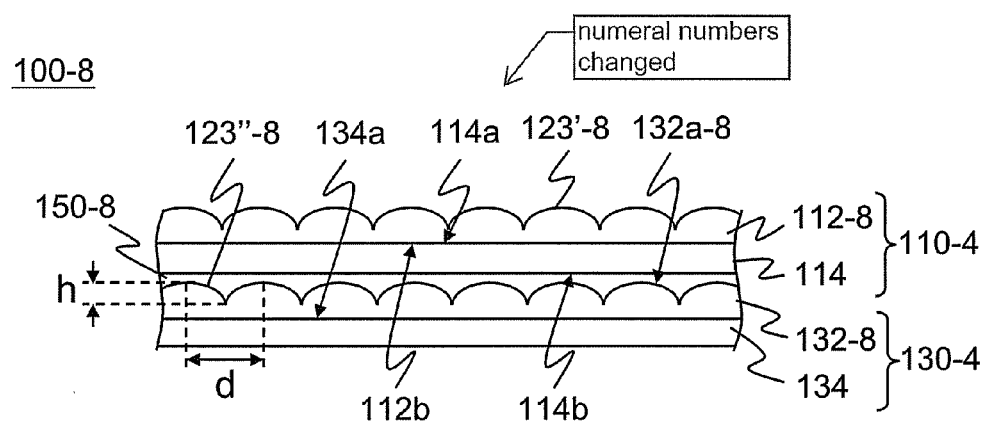
FIG. 19 is a schematic structural view of a light uniformization structure according to a ninth embodiment of the disclosure.

In the light uniformization structure 100-7, as shown in FIG. 18, both of the two microstructure films 110-3, 130-3 adopt the structure formed by the first and the second material layers 112-7, 132-7 and base materials 114, 134.

In the light uniformization structure 100-8, as shown in FIG. 19, both of the two microstructure films 110-4, 130-4 adopt the structure formed by the first and the second material layers 112-8, 132-8 and base materials 114, 134.

Referring to FIGS. 16 and 17, when one microstructure film 110-1/110-2 adopts the structure formed by the material layer (the first material layer 112-5/112-6) and the base material 114, one surface 114a of the base material 114 of the microstructure film 110-1/110-2 touches the first material layer 112-1/112-2, and another surface 114b of the base material 114 opposite to the surface 114a touches the spacer layer 150-5/150-6. In other words, the other surface 114b of the base material 114 touches one side of the spacer layer 150-5/150-6 opposite to the second material layer 132-5/132-6.

Referring to FIGS. 18 and 19, when both of the two microstructure films 110-3/110-4, 130-3/130-4 adopt the structure formed by the material layer and the base material, the other surface 114b of the base material 114 touches the side of the spacer layer 150-7/150-8 opposite to the second material layer 132-7/132-8. The surface 114a of the base material 114 of the microstructure film 110-3/110-4 touches the first material layer 112-7/112-8, and the other surface 114b of the base material 114 opposite to the surface 114a touches the spacer layer 150-7/150-8. One surface 134a of the base material 134 of the microstructure film 130-3/130-4 touches the second material layer 132-7/132-8, and the spacer layer 150-7/150-8 is clamped between the second material layer 132-7/132-8 and the base material 114. In other words, the other surface 114b of the base material 114 and the surface (the first surface 132a-7/132a-8) of the second material layer 132-7/132-8 opposite to the base material 134 respectively touch the two opposite surfaces of the spacer layer 150-7/150-8.

In manufacturing, the microstructure film formed by a single material layer can be manufactured through injection molding of plastic material, or by hot extrusion molding using a roller die having a stamp structure corresponding to the microstructures to be formed.

The microstructure film formed by the material layer and the base material 124 can be manufactured by using a plastic material as the base material 124, and then coating a layer of glue (for example, UV glue) having a refractive index close to the refractive index of the plastic material onto the base material 124 by roller coating using a roller die. Moreover, during rolling, the stamp structure of the roller die is roller-printed on the glue, so as to form the microstructures 123.

For the stamp structure on the roller die, a stamp pattern corresponding to the microstructures can be cut on copper or nickel by using a diamond knife according to the shape of the microstructures to be formed.

In the disclosure, at least one of the designs of the microstructure film (that is, the microstructure film 110/130) and the spacer layer shown in FIGS. 2 to 19 and corresponding descriptions thereof can be applied in the light uniformization structure 100 shown in FIG. 1 and corresponding descriptions thereof at will.

Figure 20:
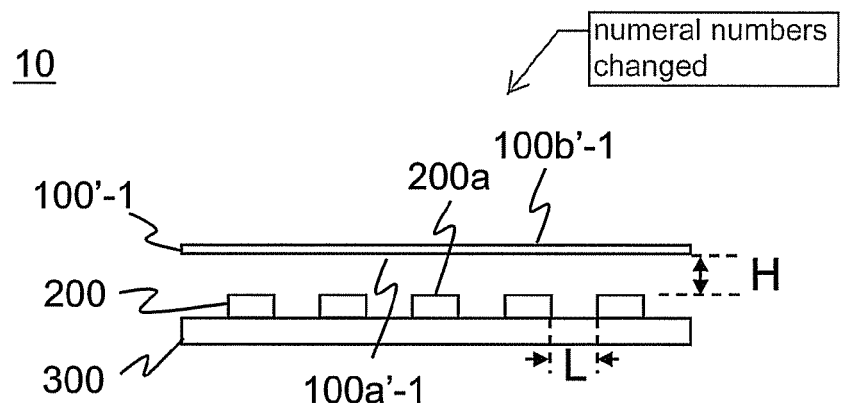
FIG. 20 is a schematic structural view of a light emitting module according to a first embodiment of the disclosure.
Figure 21:
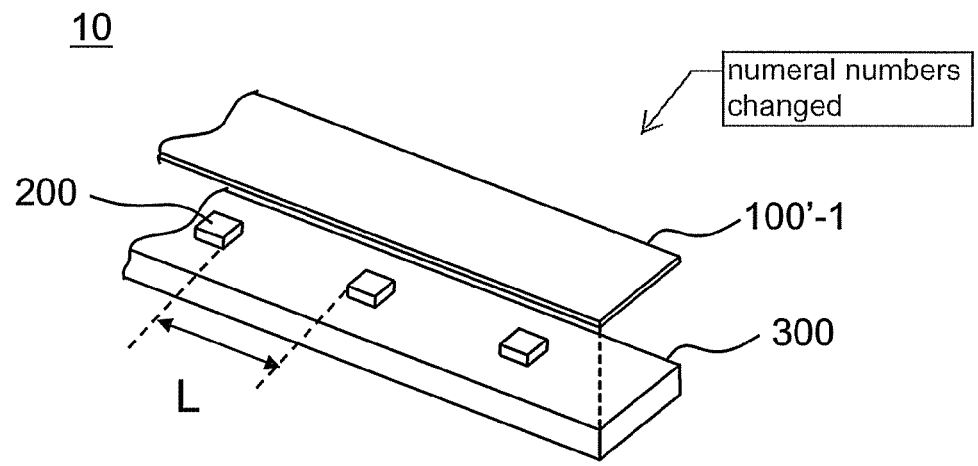
FIG. 21 is a schematic structural view of a light emitting module according to a second embodiment of the disclosure.

Referring to FIGS. 20 and 21, the light uniformization structure 100'-1 of the disclosure can be applied in a light emitting module 10, so as to receive light emitted by a light source module 200, uniformize the received light, and transmit the uniformized light.

A plurality of light source modules 200 is located between the light uniformization structure 100'-1 and a base plate 300.

One surface 100a of the light uniformization structure 100'-1 faces light emitting surfaces 200a of the light source modules 200, so as to receive light generated by the light source modules 200.

The light uniformization structure 100'-1 uses a low refractive index layer (that is, the spacer layer) and high refractive index layers having surface structures (that is, the first and the second material layers) to uniformize the received light by multiple refractions, and transmits the uniformized light through another surface 100b'-1 of the light uniformization structure 100'-1 opposite to the surface 100a'-1.

Figure 22:
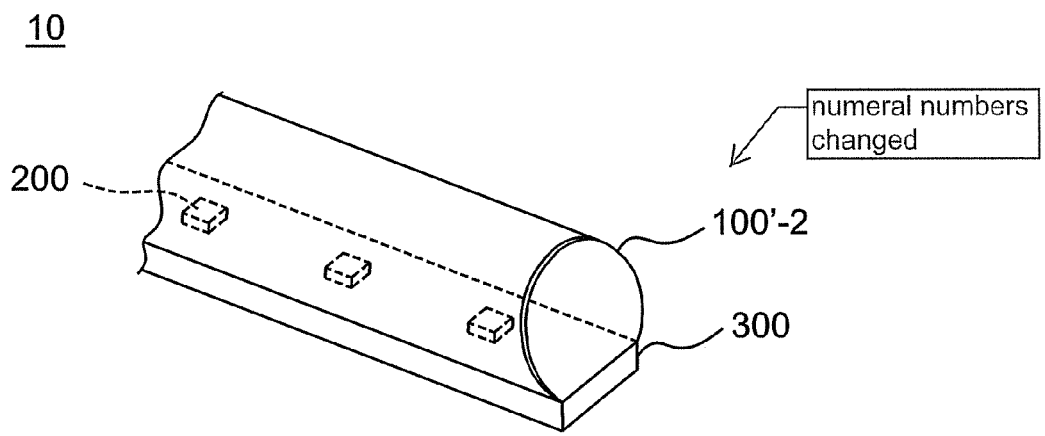
FIG. 22 is a schematic structural view of a light emitting module according to a third embodiment of the disclosure.

The light uniformization structure 100'-1 can be disposed spaced from the light source modules 200 and the base plate 300 by a particular distance, as shown in FIGS. 20 and 21. In addition, edges of the light uniformization structure 100'-2 can touch the base plate 300, so as to form an accommodation space, and the light source modules 200 are disposed in the accommodation space, as shown in FIG. 22.

Figure 23:
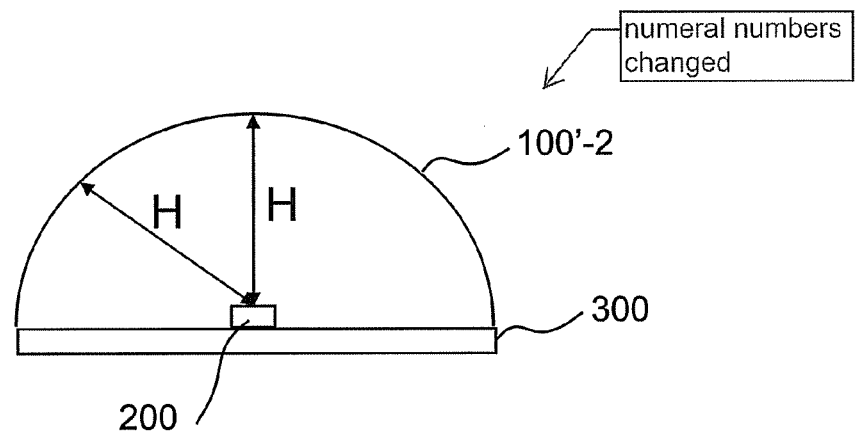
FIG. 23 is a schematic side view of the light emitting module according to the third embodiment of the disclosure.

Moreover, a ratio L/H of a distance L between two neighboring light source modules 200 to a distance H between the light source module 200 and the light uniformization structure 100'-1/100'-2 can be designed as 0.5≤L/H≤1. Taking FIG. 20 as an example, the light source module 200 and the light uniformization structure 100'-1 are maintained at a distance H, such that the ratio L/H can be 1. FIG. 23 is a side view of the embodiment of FIG. 22. Referring to FIG. 23, in this embodiment, although the edges of the light uniformization structure 100'-2 can touch the base plate 300 to form a semicircle, the distance H between the light source module 200 and the light uniformization structure 100'-2 remains constant, such that L/H can be 1; however, the disclosure is not limited thereto. The distance L between the two neighboring light source modules 200 may be, but not limited to, 0 mm to 5 cm. When the distance L is 0 mm, the two neighboring light source modules 200 are in contact with each other.

Figure 24:
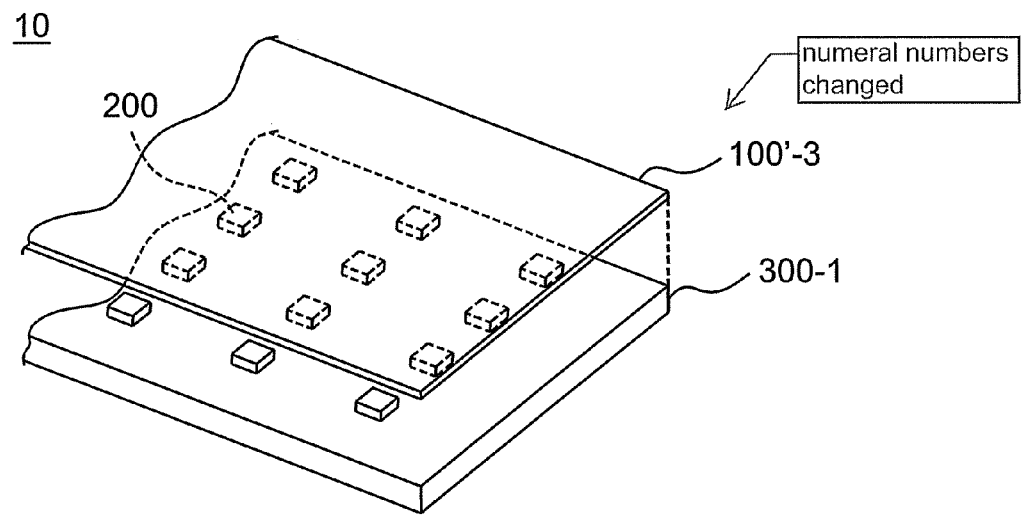
FIG. 24 is a schematic structural view of a light emitting module according to a fourth embodiment of the disclosure.

Here, the light source modules 200 can be point light sources or linear light sources. The light source modules 200 can be arranged in an one-dimensional configuration (as shown in FIGS. 21 and 22) or in a two-dimensional configuration. The two-dimensional configuration can be, for example, an array configuration (as shown in FIG. 24), a circularly symmetric configuration (as shown in FIG. 25), or a radial configuration (as shown in FIG. 26).

The light source modules 200 can be disposed between the light uniformization structure and the base plate, and disposed on the base plate. The light source modules 200 can be arranged on the base plate in an one-dimensional configuration or in a two-dimensional configuration (for example, array, radial, or circularly symmetric configuration).

As shown in FIGS. 21 and 22, the light source modules 200 can be disposed between the light uniformization structure 100'-1/100'-2 and the base plate 300, and be arranged on the base plate 300 in an one-dimensional configuration. As shown in FIG. 24, the light source modules 200 can be disposed between the light uniformization structure 100'-3 and the base plate 300-1, and be arranged on the base plate 300-1 in an array configuration.

Figure 25:
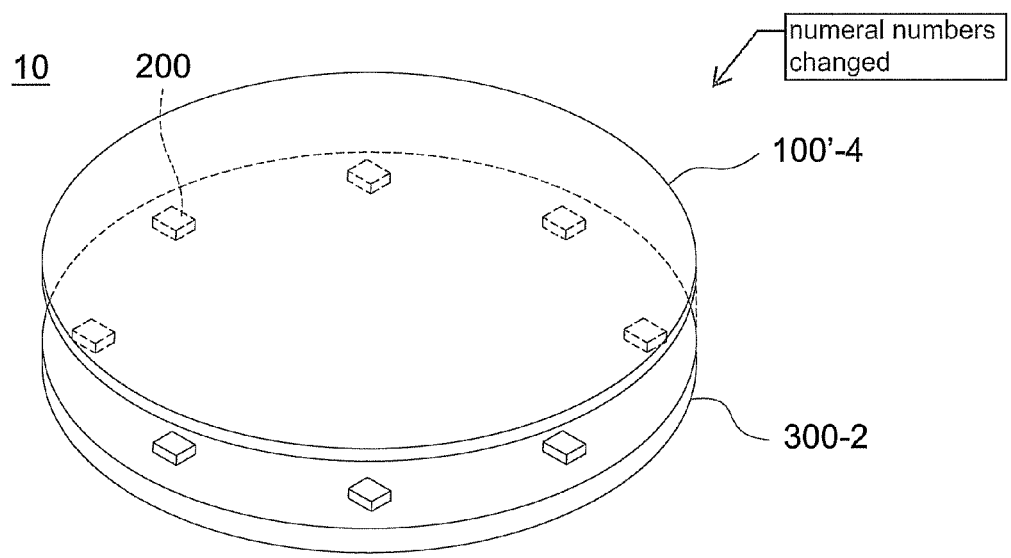
FIG. 25 is a schematic structural view of a light emitting module according to a fifth embodiment of the disclosure.
Figure 26:
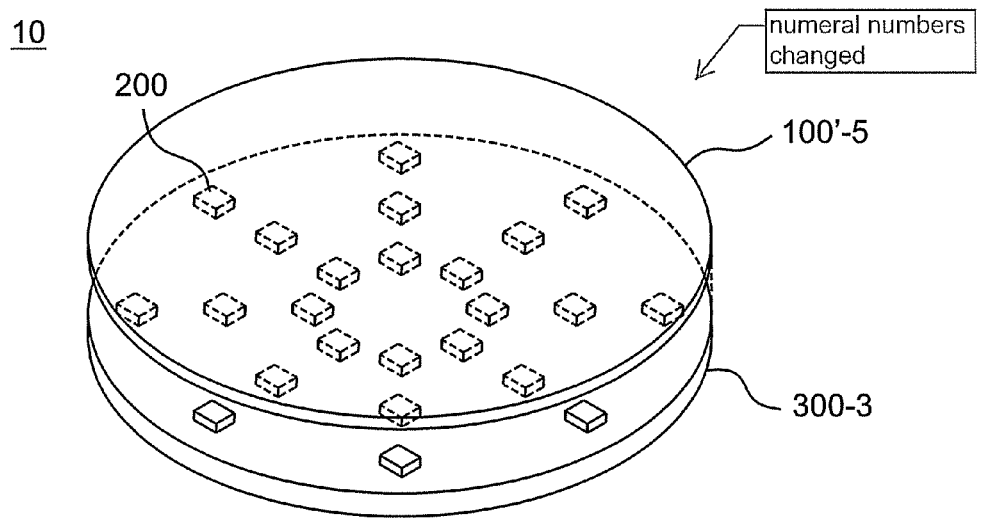
FIG. 26 is a schematic structural view of a light emitting module according to a sixth embodiment of the disclosure.

As shown in FIG. 25, the light source modules 200 can be disposed between the light uniformization structure 100'-4 and the base plate 300-2, and be arranged on the base plate 300-2 in a radial configuration.

As shown in FIG. 26, the light source modules 200 can be disposed between the light uniformization structure 100'-5 and the base plate 300-3, and be arranged on the base plate 300-3 in a circularly symmetric configuration.

The light uniformization structure can uniformize the point light sources formed by the light source modules 200 into linear light sources or surface light sources. Alternatively, the light uniformization structure can uniformize the linear light sources formed by the light source modules 200 into surface light sources.

Here, the light emitting module 10 of FIG. 21 using the light uniformization structure 100-8 of FIG. 19 is tested. The first material layer 112-8 uses an UV glue having a refractive index of 1.565, and the second material layer 132-8 also uses the UV glue having the refractive index of 1.565. The base material 114 uses PET having a refractive index of 1.6, and the base material 134 uses PET having a refractive index of 1.6. The spacer layer 150-8 uses an UV glue having a refractive index of 1.48. Here, a surface of the base material 134 opposite to the second material layer 132-8 faces the light source modules 200. Moreover, a ratio h/d of a height h of each microstructure 123'-8/123"-8 to a distance d (or referred to as a period) between center points of two neighboring microstructures can be 0.5≥h/d≥0.3. The radius of curvature of each microstructure 123'-8/123"-8 is in a range of 5 μm to 250 μm, and may be the radius of curvature of the cambered surface as shown in FIG. 8 or FIG. 19. The period of each microstructure 123'-8, 123"-8 may be in a range of 5 μm to 400 μm. In this embodiment, the ratio h/d of the height h of each microstructure 123'-8/123"-8 to the distance d between center points of two neighboring microstructures is 0.5. Here, the distance d between center points of two neighboring microstructures 123 is 60 μm, the height h of each microstructure 123'-8/123"-8 is 30 μm, and aspherical microstructures are used. The height of each microstructure 123'-8/123"-8 refers to a distance between the highest point (apex) and the lowest point of the microstructure 123.

Figure 27:
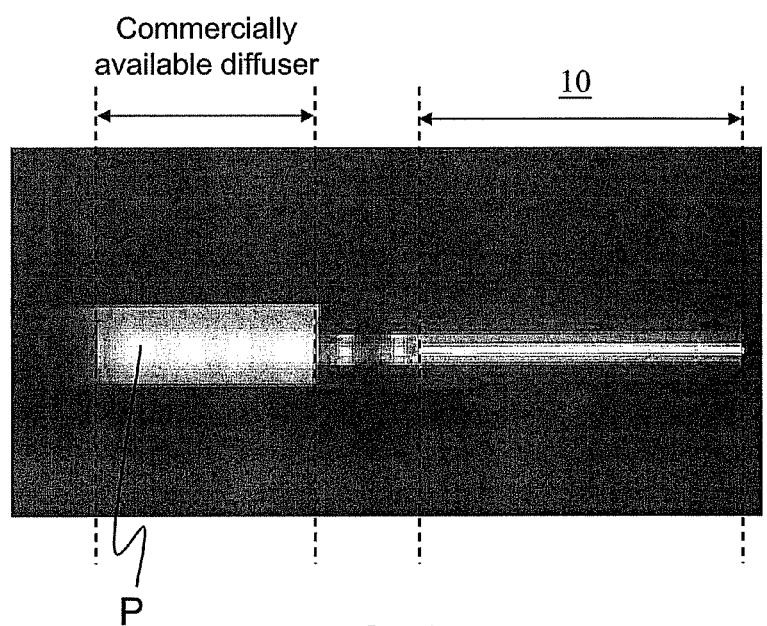
FIG. 27 is a graph of a luminous test on a light emitting module of the disclosure and a light emitting module using a commercially available diffuser.

Referring to FIG. 27, the right side in the figure shows the light emitting module of the disclosure, and the left side in the figure shows a light emitting module using a commercially available diffuser. Compared with the commercially available diffuser, with the same settings of the height and the light source modules of the light emitting module, the light emitting module 10 of the disclosure can generate a uniform linear light source, but the light emitting module using the commercially available diffuser still has visible light points P.

Moreover, the light emitting module 10 of the disclosure can reach a transmittance of 90%.

Figure 28:
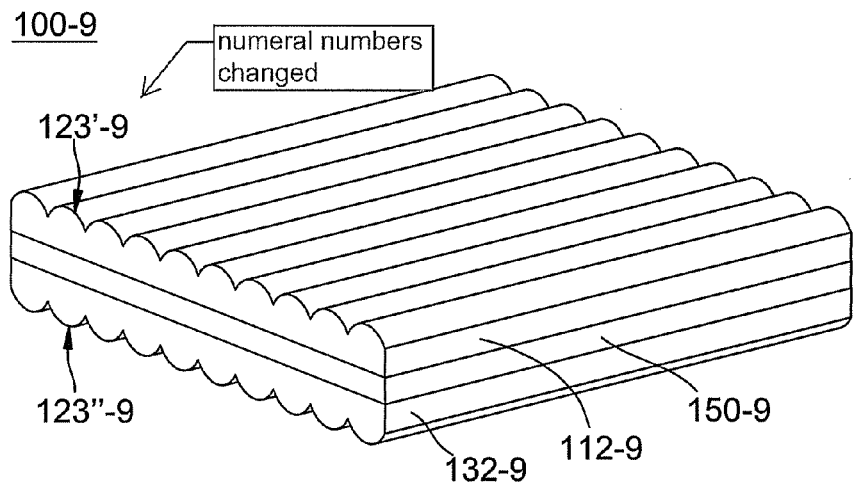
FIG. 28 is a schematic partial structural view of a light uniformization structure according to a tenth embodiment of the disclosure.
Figure 29:
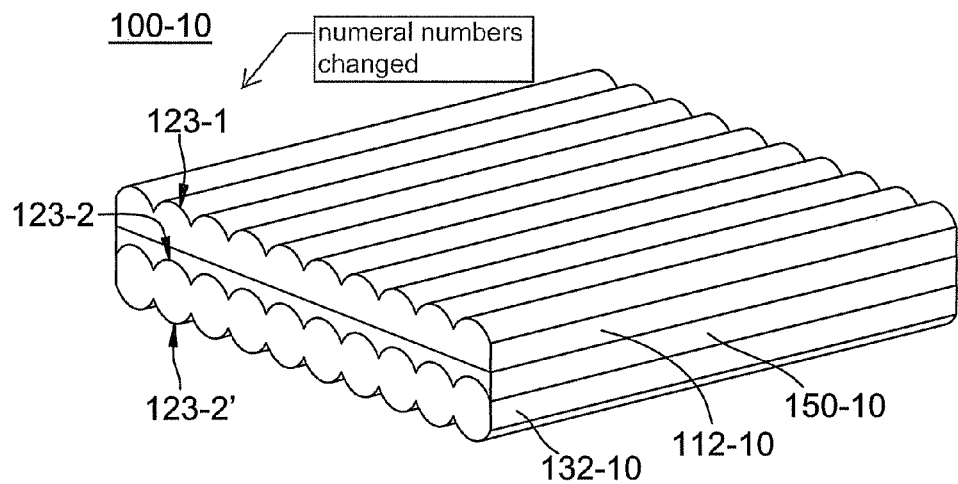
FIG. 29 is a schematic partial structural view of a light uniformization structure according to an eleventh embodiment of the disclosure.

FIG. 28 is a schematic structural view of a light uniformization structure 100-9 according to a tenth embodiment of the disclosure, which shows only a small part of the light uniformization structure 100-9 after amplification. Referring to FIG. 28, the light uniformization structure 100-9 includes a first material layer 112-9, a second material layer 132-9, and a spacer layer 150-9. The microstructure 123-9 in the first material layer 112-9 and the microstructure 123-9 in the second material layer 132-9 are located on two opposite external surfaces of the light uniformization structure 100-9. Further, FIG. 29 is a schematic structural view of a light uniformization structure according to an eleventh embodiment of the disclosure. Referring to FIG. 29, the light uniformization structure 100-10 includes a first material layer 112-10, a second material layer 132-10, and a spacer layer 150-10. The first material layer 112-10 is as shown in the first embodiment of the microstructure film in FIG. 2, and the second material layer 132-10 is as shown in the second embodiment of the microstructure film in FIG. 3.

As the first material layer 112-9/112-10 and the second material layer 132-9/132-10 have different microstructures, the microstructures may have different patterns, different disposing directions (or referred to as different disposing angles), or different shapes. The microstructures having different patterns refer to the microstructures constituted by any two stripe forms selected from straight stripes, curved stripes, concentric-circle stripes, and other patterns. The microstructures having different shapes refer to the microstructures having two different sectional shapes selected from a circle, a rectangle, and other geometrical shapes. In addition, the microstructures having different shapes also refer to the microstructures having the same geometrical shape but of different sizes, for example, the first material layer 112-9/132-10 and the second material layer 132-9/132-10 both have the microstructures with a circular section and straight stripes but of different radiuses.

Figure 30A:
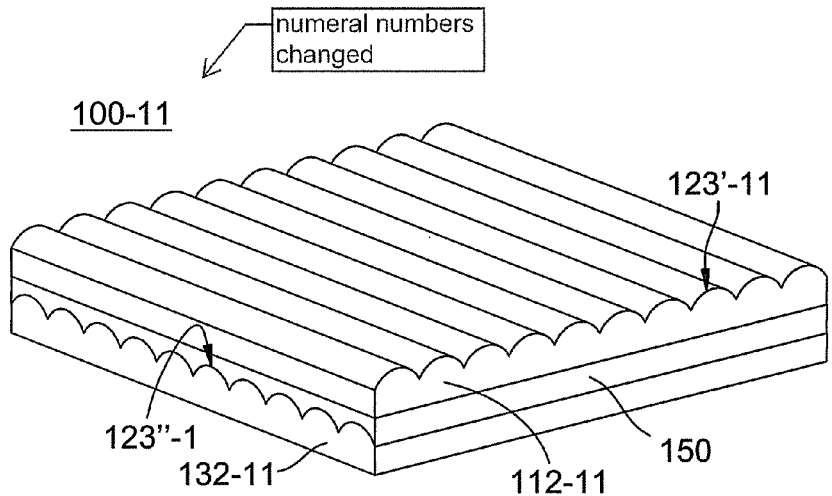
FIGS. 30A and 30B are respectively a schematic partial structural view and a schematic three-dimensional exploded view of a light uniformization structure according to a twelfth embodiment of the disclosure.
Figure 30B:
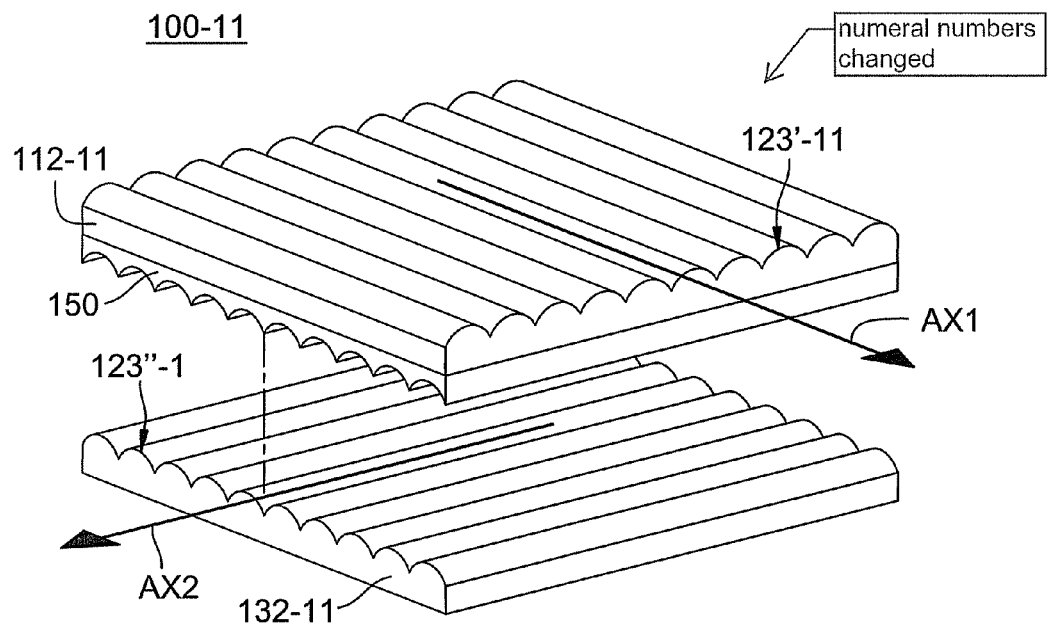

The different disposing directions refer to that an angle formed between a main axis direction of the microstructure in the first material layer and a main axis direction of the microstructure in the second material layer is actually in a range of 10° to 90° (the angle herein refers to an acute angle formed by the two main axes), which can be seen in FIGS. 30A and 30B. FIG. 30A is a schematic structural view of the light uniformization structure 100-11 according to a twelfth embodiment of the disclosure. FIG. 30B is a schematic three-dimensional exploded view of the light uniformization structure 100-11 according to the twelfth embodiment of the disclosure. Referring to FIGS. 30A and 30B, the main axis direction AX1 (referred to as a first main axis hereinafter) of the microstructure 123'-11 in the first material layer 112-11 forms an angle of 90° with the main axis direction AX2 (referred to as a second main axis hereinafter) of the microstructure 123"-11 in the second material layer 132-11 (seen from the top of the figures). When the first main axis AX1 forms an angle of 90° with the second main axis AX2, the light uniformization effect produced by the light uniformization structure 100-11 is superior to that shown in FIG. 27. It can be seen from FIG. 27 that, when the first material layer 112-11 and the second material layer 132-11 adopt the same microstructure (including the situation that the angle formed by the first main axis and the second main axis is 0°), the produced light uniformization effect is superior to that of a conventional diffuser, and a uniform surface light source in a slightly narrow strip shape is obtained; while when the first material layer 112-11 and the second material layer 132-11 adopt different microstructures, the produced light uniformization effect leads to a uniform light source in a wide strip shape, and after the spacing between the light sources is appropriately arranged, a uniform surface light source is obtained. The details will be illustrated hereinafter.

Regarding the definition of the main axis direction, for the microstructure in straight stripes as shown in FIG. 4A, the main axis direction is a long axis direction of the straight stripes, and for the curved stripes in FIG. 4B, the main axis direction is a straight line direction calculated with a single stripe in a straight line approximation manner. For example, in FIG. 4B, the main axis direction is a horizontal direction in the figure.

Figure 31:
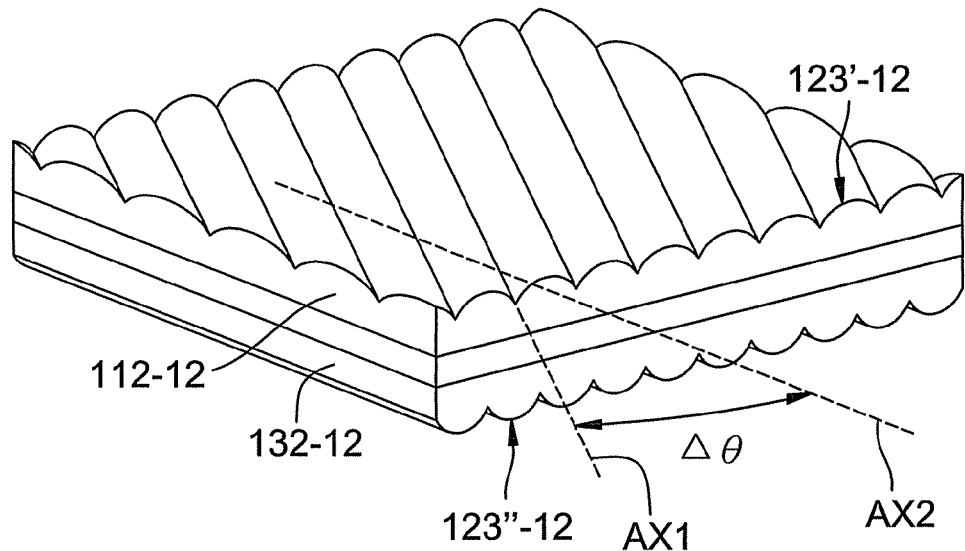
FIG. 31 is a schematic partial structural view of a light uniformization structure according to a thirteenth embodiment of the disclosure.

FIG. 31 is a schematic partial structural view of a light uniformization structure according to a thirteenth embodiment of the disclosure. Referring to FIG. 31, an angle Δθ of the microstructure 123'-12 in the first material layer 112-12 is formed between the first main axis AX1 and the second main axis AX2 of the microstructure 123"-12 in the second material layer 132-12 (seen from the top of the figure). When Δθ is in a range of 10° to 90°, the produced light uniformization effect may not be influenced by the arrangement of light emitting sources in the light source module, which will be illustrated in the following.

Figure 32A:
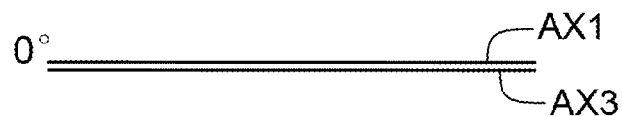
FIGS. 32A, 32B, and 32C are respectively a schematic view, a light uniformization effect diagram, and a light intensity curve diagram showing that a single material layer is applied to the light emitting module in FIG. 27 and a main axis direction of the material layer is the same as an arrangement direction of LEDs.
Figure 32B:
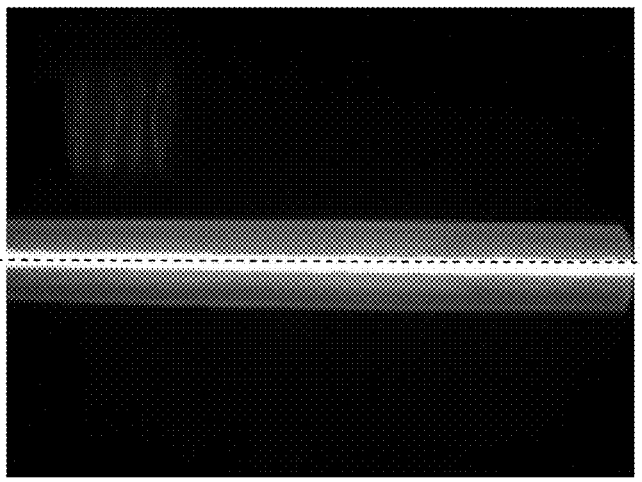
Figure 32C:
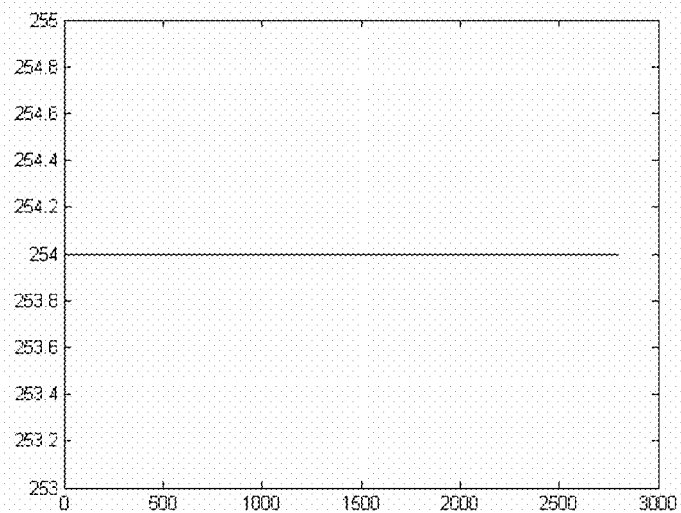

The impact on the light uniformization effect in the main axis direction is shown in FIGS. 32A, 32B, and 32C, which are respectively a schematic view, a light uniformization effect diagram, and a light intensity curve diagram showing that a single material layer is applied to the light emitting module in FIG. 27 and a main axis direction of the material layer is the same as an arrangement direction of LEDs. The adopted material layer has the microstructure as shown in FIG. 4A, and seen from FIG. 32A, the main axis direction AX1 of the material layer is parallel to (that is, the same as) the arrangement direction AX3 of the LEDs (that is, the horizontal axis direction in FIG. 27, and also the long axis direction in FIG. 27). It can be seen from FIG. 32B that, the light uniformization effect obtained in this embodiment is superior to the effect shown in the right part of FIG. 27, and the obtained light uniformization area is in a slightly narrow strip shape. In FIG. 32C, a curve diagram of light intensity distribution at a cross-section AX4 of FIG. 32B is shown, in which the horizontal axis represents a relative distance (A.U., Arbitrary unit) with a unit length in positive correlation to a pitch of the microstructure, and the vertical axis represents a relative intensity. It can be seen from FIG. 32C that, when the main axis direction AX1 of the material layer is parallel with the arrangement direction AX3 of the LEDs, the obtained light intensity is quite uniform.

Figure 33A:
FIGS. 33A, 33B, and 33C are respectively a schematic view, a light uniformization effect diagram, and a light intensity curve diagram showing that a single material layer is applied to the light emitting module in FIG. 27 and a main axis direction of the material layer forms an angle of 10° with an arrangement direction of LEDs.
Figure 33B:
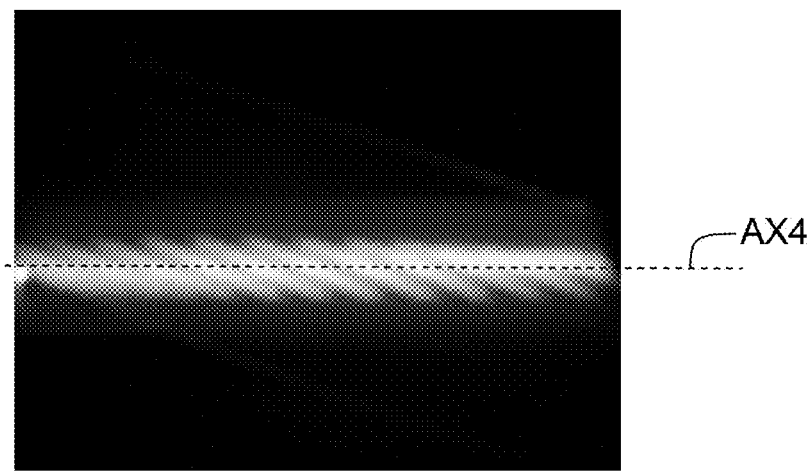
Figure 33C:
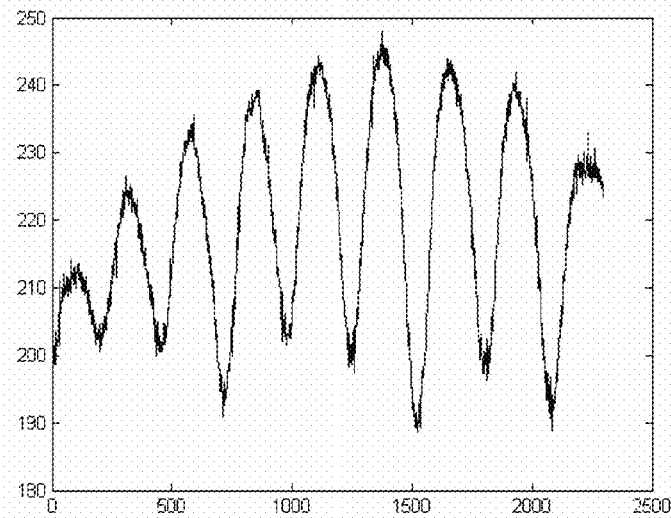
Figure 34A:
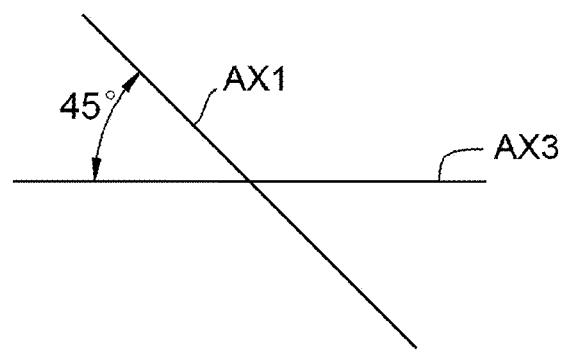
FIGS. 34A, 34B, and 34C are respectively a schematic view, a light uniformization effect diagram, and a light intensity curve diagram showing that a single material layer is applied to the light emitting module in FIG. 27 and a main axis direction of the material layer forms an angle of 45° with an arrangement direction of LEDs.
Figure 34B:
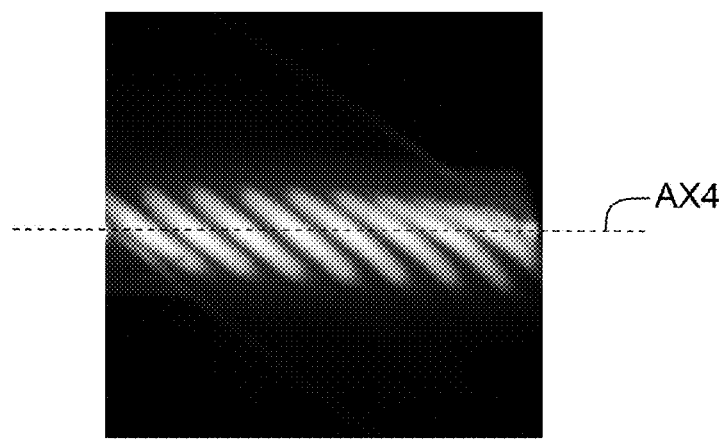
Figure 34C:
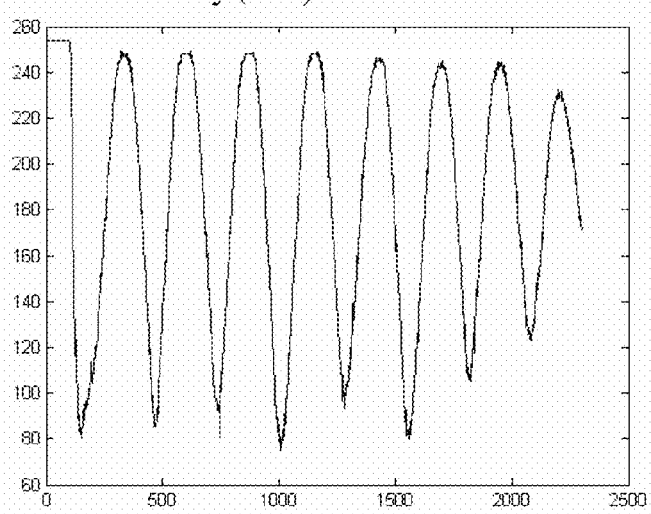
Figure 35A:
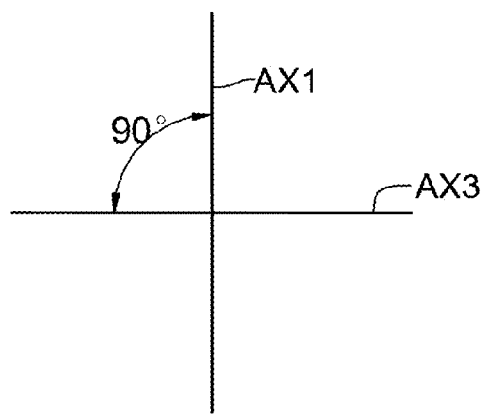
FIGS. 35A, 35B, and 35C are respectively a schematic view, a light uniformization effect diagram, and a light intensity curve diagram showing that a single material layer is applied to the light emitting module in FIG. 27 and a main axis direction of the material layer forms an angle of 90° with an arrangement direction of LEDs.
Figure 35B:
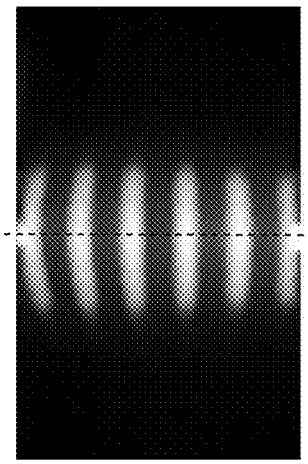
Figure 35C:
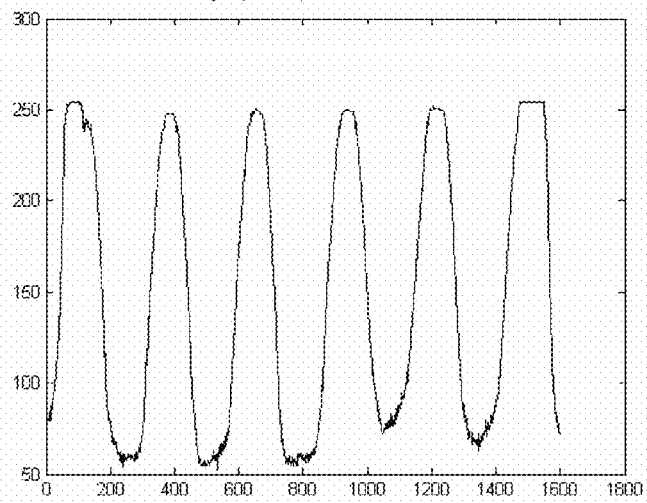

FIGS. 33A, 33B, and 33C are respectively a schematic view, a light uniformization effect diagram, and a light intensity curve diagram showing that a single material layer is applied to the light emitting module in FIG. 27 and a main axis direction of the material layer forms an angle of 10° with an arrangement direction of LEDs. Referring to FIGS. 33A, 33B, and 33C, when the main axis direction AX1 of the material layer forms an angle of 10° with the arrangement direction AX3 of the LEDs, waves are generated in the obtained light intensity distribution. Compared with FIG. 32C, it can be clearly seen that a poor uniformity is obtained in FIG. 33C. Similarly, the uniformity obtained in an embodiment that the two directions form an angle of 45° as shown in FIGS. 34A, 34B, and 34C and the uniformity obtained in an embodiment that the two directions form an angle of 90° as shown in FIGS. 35A, 35B, and 35C are both less desirable than that obtained in FIG. 32C.

Figure 36A:
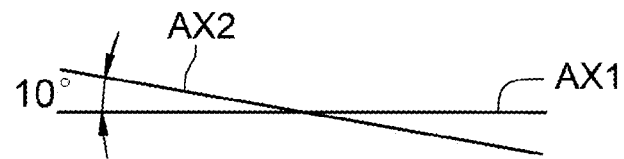
FIGS. 36A, 36B, and 36C are respectively a schematic view, a light uniformization effect diagram, and a light intensity curve diagram showing that the thirteenth embodiment of the disclosure is applied to the light emitting module in FIG. 27 and a first main axis direction forms an angle of 10° with a second main axis direction.
Figure 36B:
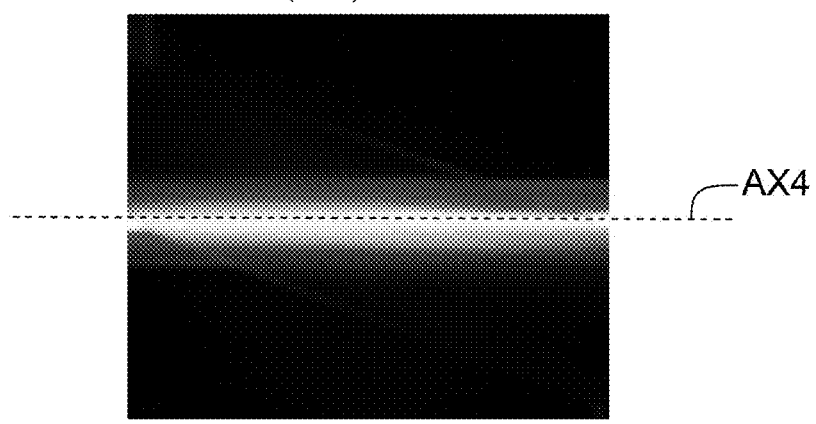
Figure 36C:
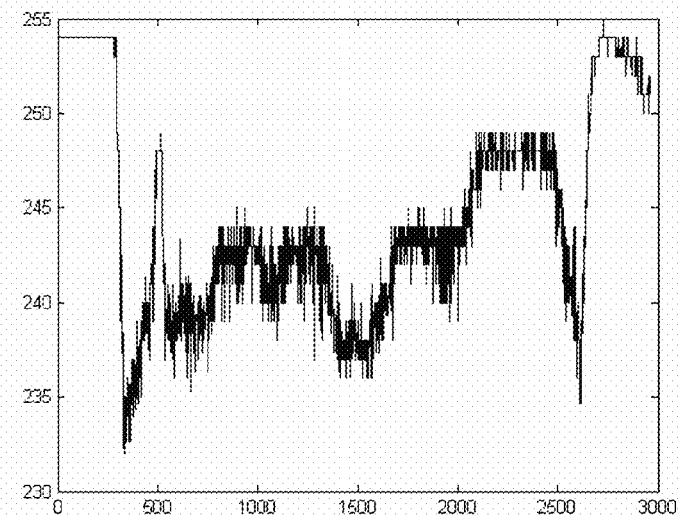

FIGS. 36A, 36B, and 36C are respectively a schematic view, a light uniformization effect diagram, and a light intensity curve diagram showing that the thirteenth embodiment of the disclosure is applied to the light emitting module in FIG. 27 and a first main axis direction forms an angle of 10° with a second main axis direction. It can be clearly seen from FIG. 36B that, the light uniformization area after processing is still in a narrow strip shape, but its width (that is, the distance in the vertical direction in the figure) is larger than that in FIG. 32B. Moreover, it can be clearly seen by comparing FIG. 36C with FIG. 32C that, no wave is produced in FIG. 36C, unlike that in FIG. 32C, so that the light uniformization effect is improved.

Figure 37A:
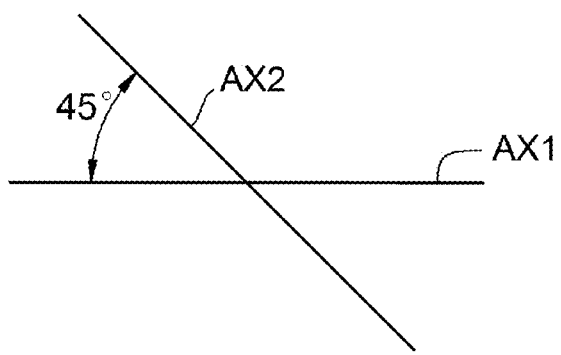
FIGS. 37A, 37B, and 37C are respectively a schematic view, a light uniformization effect diagram, and a light intensity curve diagram showing that the thirteenth embodiment of the disclosure is applied to the light emitting module in FIG. 27 and a first main axis direction forms an angle of 45° with a second main axis direction.
Figure 37B:
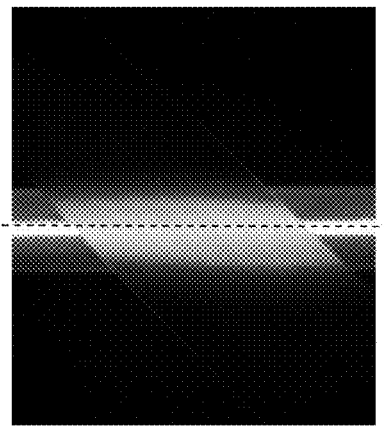
Figure 37C:
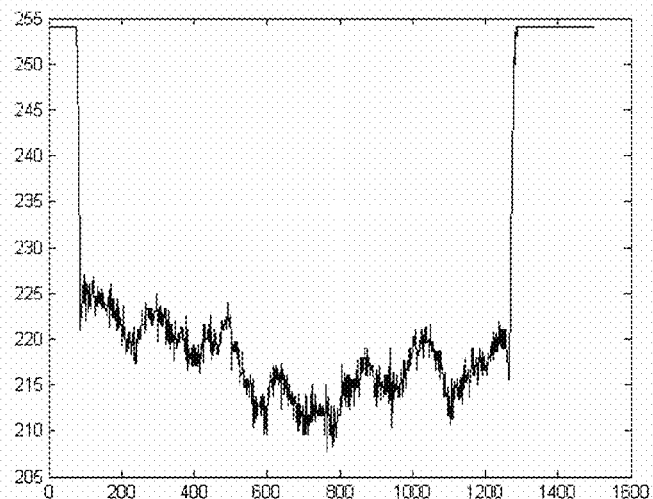

FIGS. 37A, 37B, and 37C are respectively a schematic view, a light uniformization effect diagram, and a light intensity curve diagram showing that the thirteenth embodiment of the disclosure is applied to the light emitting module in FIG. 27 and a first main axis direction forms an angle of 45° with a second main axis direction. It can be clearly seen from FIG. 37B that, the light uniformization area is expanded from the narrow strip shape in FIG. 36B into a wide strip shape, and although a bevel edge of 45° appears on two sides, the overall light uniformization effect may not be affected. It can be further seen from FIG. 37C that, the relative light intensity of the light uniformization area is more uniform.

Figure 38A:
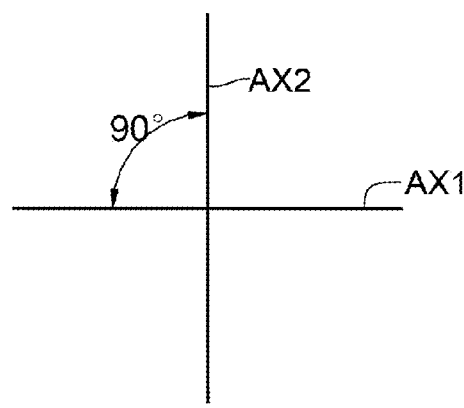
FIGS. 38A, 38B, and 38C are respectively a schematic view, a light uniformization effect diagram, and a light intensity curve diagram showing that the thirteenth embodiment of the disclosure is applied to the light emitting module in FIG. 27 and a first main axis direction forms an angle of 90° with a second main axis direction.
Figure 38B:
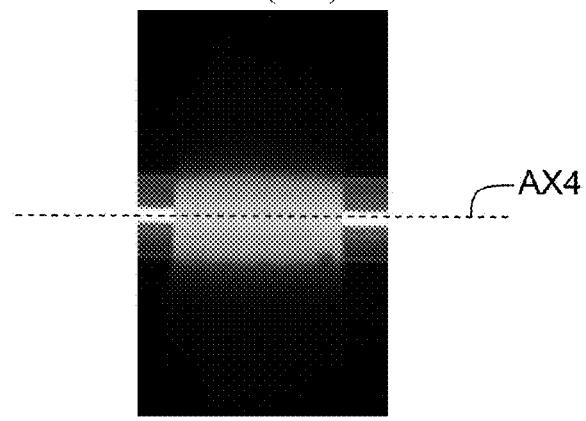
Figure 38C:
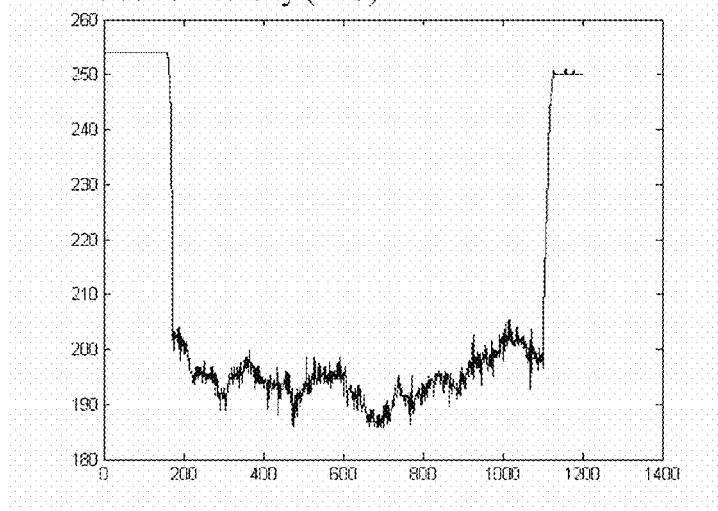

FIGS. 38A, 38B, and 38C are respectively a schematic view, a light uniformization effect diagram, and a light intensity curve diagram showing that the thirteenth embodiment of the disclosure is applied to the light emitting module in FIG. 27 and a first main axis direction forms an angle of 90° with a second main axis direction. It can be seen from FIG. 38B that, the light uniformization effect obtained in this embodiment is superior to that obtained in any of the foregoing embodiments. It can be further seen in FIG. 38C that, when the first main axis AX1 forms an angle of 90° with the second main axis AX2, the obtained light uniformization effect is superior to the embodiment in which the formed angle is 45°.

It can be clearly seen from the foregoing embodiments that, when the angle formed between the first main axis AX1 and the second main axis AX2 is in a range of 10° to 90° (that is, in a range of 90° to 170°), the obtained light uniformization area is significantly improved as compared with the conventional one (that is, the embodiment as shown in the left part of FIG. 27). Further, if the angle formed between the first main axis AX1 and the second main axis AX2 is in a range of 10° to 90°, in spite of the direction (or angle) that the light uniformization structure of the disclosure is placed in the light source module, the required light uniformization effect may not be affected.

Figure 39:
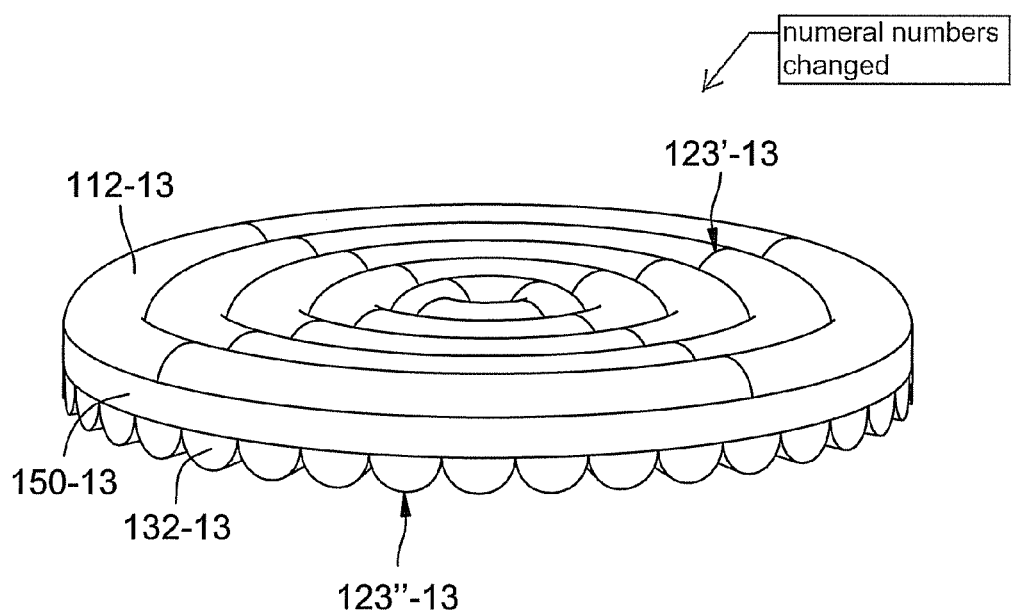
FIG. 39 is a schematic partial structural view of a light uniformization structure according to a fourteenth embodiment of the disclosure.

FIG. 39 is a schematic partial structural view of a light uniformization structure according to a fourteenth embodiment of the disclosure. Referring to FIG. 39, the light uniformization structure includes a first material layer 112-13, a second material layer 132-13, and a spacer layer 150-13. The microstructure 123'-13 in the first material layer 112-13 is in a concentric-circle shape, and the microstructure 123"-13 in the second material layer 132-13 is a radial line from the center of the concentric-circle. In this manner, as the microstructure 123'-13 in the first material layer 112-13 is different from the microstructure 123"-13 in the second material layer 132-13, a preferred light uniformization effect is obtained.

The disclosure being thus described, it will be obvious that the same may be varied in many ways. Such variations are not to be regarded as a departure from the spirit and scope of the disclosure, and all such modifications as would be obvious to one skilled in the art are intended to be included within the scope of the following claims.

What is claimed is:

1. A light uniformization structure, comprising:
   a first material layer, being light transmissive and having a first surface and a second surface opposite to each other, a plurality of microstructures provided in the first surface of the first material layer, and the microstructures of the first material layer structured in stripes extending along a first main axis;
   a second material layer, being light transmissive and having a first surface and a second surface opposite to each other, a plurality of microstructures provided in the first surface of the second material layer, the microstructures of the second material layer structured in stripes extending along a second main axis, and an angle formed between the first main axis and the second main axis being greater than or equal to 10° and being smaller than or equal to 90°; and
   a spacer layer, located between the first material layer and the second material layer, wherein a refractive index of the spacer layer is smaller than a refractive index of the first material layer and a refractive index of the second material layer.

2. The light uniformization structure according to claim 1, wherein the spacer is an air layer or a substantially solid material layer.

3. The light uniformization structure according to claim 1, wherein the light uniformization structure includes a plurality of light source modules, and a distance between two neighboring light source modules is in a range of 0 mm to 5 cm.

4. The light uniformization structure according to claim 1, further comprising:
   a base material, a surface of the base material touching the second surface of the first material layer;
   wherein the second material layer is located in a side of the base material opposite to the first material layer, and a difference between a refractive index of the base material and the refractive index of the first material layer is smaller than or equal to 0.075.

5. The light uniformization structure according to claim 4, wherein the base material is a material having the refractive index equal to or greater than 1.49.

6. The light uniformization structure according to claim 1, wherein each microstructure has a shape of one of a columnar structure, a V-shaped structure, a spherical structure, or an aspherical structure.

7. The light uniformization structure according to claim 6, wherein each microstructure has a shape of an aspherical structure, the aspherical structure is a curved surface, and the curved surface satisfies the following equation:

$$Z = \frac{cr^2}{\left(1 + (1 - (1+k)c^2 r^2)^{\frac{1}{2}}\right)}$$

where Z represents a perpendicular distance between a tangent of an apex of the curved surface and a line passing through a lowest point of the curved surface and parallel to the tangent of the apex, c is a curvature of the apex of the curved surface, k is a conic constant, and r is a radial radius of the curved surface.

8. The light uniformization structure according to claim 7, wherein the radius is in a range of 5 μm to 250 μm, and a period of each microstructure is in a range of 5 μm to 400 μm.

9. A light emitting module, comprising:
   a light uniformization structure, comprising:
      a first material layer, being light transmissive and having a first surface and a second surface opposite to each other, a plurality of microstructures provided in the first surface of the first material layer, and the microstructures of the first material layer structured in stripes extending along a first main axis of the microstructures of the first material layer;
      a second material layer, being light transmissive and having a first surface and a second surface opposite to each other, a plurality of microstructures provided in the first surface or the second surface of the second material layer, the microstructures of the second material layer structured in stripes extending along a second main axis of the microstructures of the second material layer, and an angle formed between the first main axis and the second main axis being greater than or equal to 10° and being smaller than or equal to 90°; and a spacer layer, located between the first material layer and the second material layer, wherein a refractive index of the spacer layer is smaller than a refractive index of the first material layer and a refractive index of the second material layer;

a base plate; and at least one light source module, located between the light uniformization structure and the base plate.

10. The light emitting module according to claim 9, wherein the spacer layer is an air layer or a substantially solid material layer.

11. The light emitting module according to claim 9, wherein the light uniformization structure further comprises:

a base material, a surface of the base material touching the second surface of the first material layer;

wherein the second material layer is located in a side of the base material opposite to the first material layer, and a difference between a refractive index of the base material and the refractive index of the first material layer is smaller than or equal to 0.075.

12. The light emitting module according to claim 9, wherein the light uniformization structure further comprises:

a base material, a surface of the base material touching the second surface of the second material layer;

wherein the first material layer is located in a side of the second material layer opposite to the base material, and a difference between a refractive index of the base material and the refractive index of the second material layer is smaller than or equal to 0.075.

13. The light emitting module according to claim 9, wherein a plurality of microstructures are provided in the second surface of the first material layer.

14. The light emitting module according to claim 9, wherein a ratio of a height of each microstructure to a distance between center points of any two neighboring microstructures among the microstructures is ≥0.3 and ≤0.5.

15. The light emitting module according to claim 9, wherein the microstructures in the first surface of the first material layer form one of a stripe pattern, a mesh pattern, and a concentric-circle pattern, and the microstructures in the second material layer form one of a stripe pattern, a mesh pattern, and a concentric-circle pattern.

16. The light emitting module according to claim 9, wherein each microstructure is one of a raised structure and a recessed structure.

17. The light emitting module according to claim 9, wherein a difference between the refractive index of the spacer layer and the refractive index of the first material layer is equal to or greater than 0.08, and a difference between the refractive index of the spacer layer and the refractive index of the second material layer is equal to or greater than 0.08.

18. The light emitting module according to claim 17, wherein the refractive index of the spacer layer is between 1.4 and 1.5, the refractive index of the first material layer is equal to or greater than 1.5, and the refractive index of the second material layer is equal to or greater than 1.5.

19. The light emitting module according to claim 9, wherein the second surface of the first material layer faces the first surface of the second material layer.

20. The light emitting module according to claim 19, wherein the second surface of the first material layer touches apexes of the microstructures in the first surface of the second material layer.

21. The light emitting module according to claim 9, wherein a number of the light source module is plurality and a ratio of a distance between two neighboring light source modules to a distance between each light source module and the light uniformization structure is ≤1 and ≥0.5.

22. The light emitting module according to claim 21, wherein a distance between two neighboring light source modules is in a range of 0 mm to 5 cm.

23. The light emitting module according to claim 9, wherein each microstructure has a shape of one of a columnar structure, a V-shaped structure, a spherical structure, or an aspherical structure.

24. The light emitting module according to claim 23, wherein each microstructure has a shape of an aspherical structure, the aspherical structure is a curved surface, and the curved surface satisfies the following equation:

$$Z = \frac{cr^2}{\left(1 + (1 - (1+k)c^2r^2)^{\frac{1}{2}}\right)}$$

where Z represents a perpendicular distance between a tangent of an apex of the curved surface and a line passing through a lowest point of the curved surface and parallel to the tangent of the apex, c is a curvature of the apex of the curved surface, k is a conic constant, and r is a radial radius of the curved surface.

25. The light emitting module according to claim 24, wherein the radius is in a range of 5 μm to 250 μm, and a period of each microstructure is in a range of 5 μm to 400 μm.

* * * * *